United States Patent
Gross et al.

(10) Patent No.: US 10,203,735 B2
(45) Date of Patent: Feb. 12, 2019

(54) SYSTEMS AND METHODS FOR PROVIDING FUEL CELL POWER TO A DATA CENTER

(71) Applicant: Bloom Energy Corporation, Sunnyvale, CA (US)

(72) Inventors: Peter Gross, Sunnyvale, CA (US); James Daniel Smith, Sunnyvale, CA (US); Rajesh Gopinath, Sunnyvale, CA (US); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 364 days.

(21) Appl. No.: 13/845,942

(22) Filed: Mar. 18, 2013

(65) Prior Publication Data

US 2013/0253716 A1 Sep. 26, 2013

Related U.S. Application Data

(60) Provisional application No. 61/613,851, filed on Mar. 21, 2012, provisional application No. 61/789,343, filed on Mar. 15, 2013.

(51) Int. Cl.
*G06F 1/26* (2006.01)

(52) U.S. Cl.
CPC ...................... *G06F 1/26* (2013.01)

(58) Field of Classification Search
USPC ........................................... 700/287
See application file for complete search history.

(56) References Cited

U.S. PATENT DOCUMENTS

| 4,324,987 | A | * | 4/1982 | Sullivan, II | H02J 3/14 307/35 |
| 6,510,369 | B1 | * | 1/2003 | Lacy | H02J 3/14 700/295 |
| 6,630,752 | B2 | * | 10/2003 | Fleming | H02J 3/005 307/64 |

(Continued)

OTHER PUBLICATIONS

International search report and written opinion received in connection with International Application No. PCT/US2013/033080, dated Jul. 23, 2013.

(Continued)

*Primary Examiner* — Robert E Fennema
*Assistant Examiner* — Marzia T Monty
(74) *Attorney, Agent, or Firm* — The Marbury Law Group PLLC

(57) ABSTRACT

Systems and methods include a power module comprising at least one fuel cell generator for powering a load, and a bypass mechanism having a first, normally-open fast-acting switch that closes in 1-250 msec, and a second, normally-open switch in parallel with the first switch, the bypass mechanism being electrically connected between the load and a second power source, such as a grid source, where the first switch is configured to close in response to a fault event such that when the first switch is closed power to the load is provided from the second power source through the first switch, and the second switch closes after a predetermined time such that power to the load from the second source is provided through the second switch. Additional methods and systems include providing power to a plurality of loads using fuel cell power generators.

15 Claims, 23 Drawing Sheets

(56) References Cited

U.S. PATENT DOCUMENTS

| | | | |
|---|---|---|---|
| 7,542,256 B2* | 6/2009 | Premerlani | H02H 7/30 324/522 |
| 7,705,490 B2 | 4/2010 | Srinivasan et al. | |
| 7,808,129 B2* | 10/2010 | Mazumder | H01M 16/006 307/140 |
| 7,974,106 B2 | 7/2011 | Gurunathan et al. | |
| 8,263,276 B1 | 9/2012 | Gurunathan et al. | |
| 8,447,435 B1* | 5/2013 | Miller | G06F 1/263 700/286 |
| 8,872,392 B1 | 10/2014 | Gurunathan et al. | |
| 2005/0198963 A1* | 9/2005 | Wai | F01K 13/00 60/698 |
| 2010/0262325 A1* | 10/2010 | Fernandez | B60L 1/00 701/22 |
| 2010/0264743 A1* | 10/2010 | Jung | H02J 9/061 307/80 |
| 2011/0133558 A1* | 6/2011 | Park | H02J 3/32 307/66 |
| 2011/0144822 A1* | 6/2011 | Choi | H02J 3/32 700/297 |
| 2012/0001481 A1* | 1/2012 | Koeppen | H02P 9/007 307/9.1 |
| 2012/0098336 A1 | 4/2012 | Gurunathan et al. | |
| 2012/0146587 A1 | 6/2012 | Srinivasan et al. | |
| 2012/0267952 A1 | 10/2012 | Ballantine et al. | |
| 2012/0326504 A1 | 12/2012 | Ballantine et al. | |
| 2012/0326516 A1 | 12/2012 | Gurunathan et al. | |
| 2012/0326518 A1* | 12/2012 | Rusch | H02J 7/34 307/80 |
| 2012/0326653 A1 | 12/2012 | Godrich et al. | |
| 2012/0326668 A1 | 12/2012 | Ballantine et al. | |
| 2012/0327592 A1 | 12/2012 | Godrich et al. | |
| 2013/0163192 A1 | 6/2013 | Ballantine et al. | |
| 2013/0163193 A1 | 6/2013 | Ballantine et al. | |
| 2014/0009003 A1 | 1/2014 | Ballantine et al. | |
| 2014/0089055 A1 | 3/2014 | Smith et al. | |
| 2014/0106247 A1 | 4/2014 | Higdon et al. | |

OTHER PUBLICATIONS

International Preliminary Report on Patentability received in connection with International Application No. PCT/US2013/033080, dated Oct. 2, 2014.

* cited by examiner

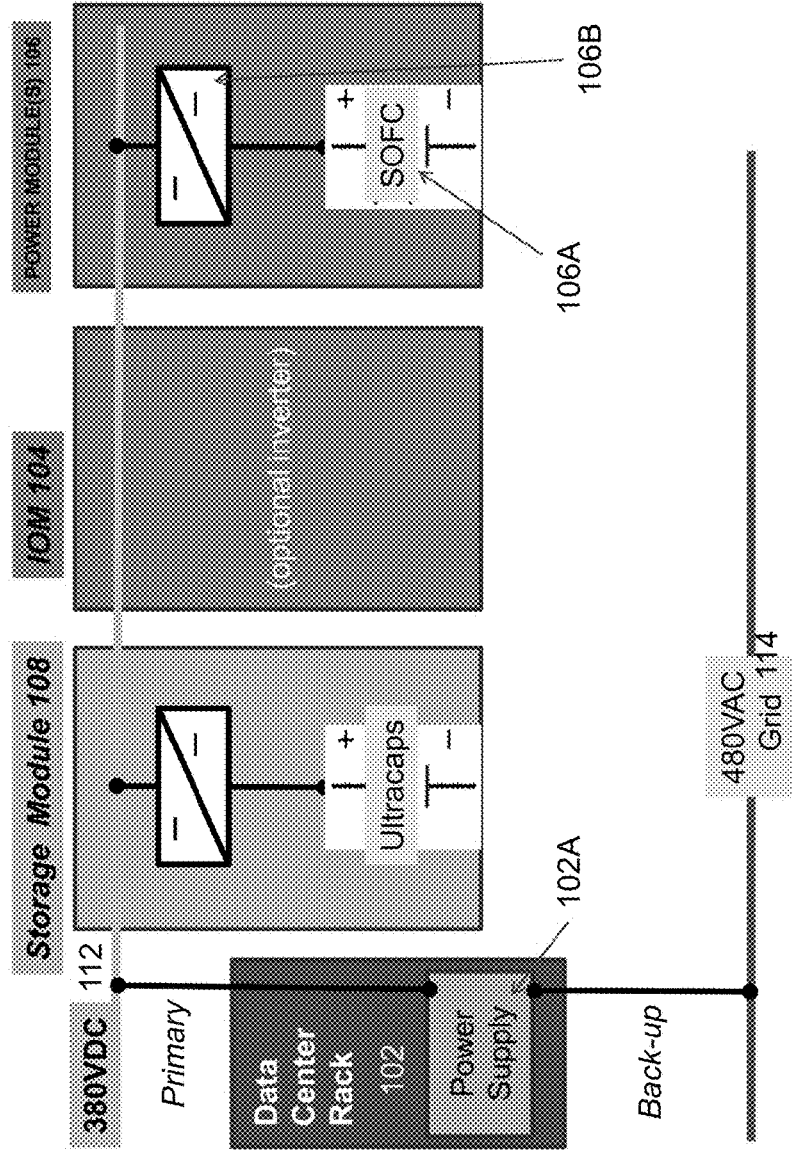

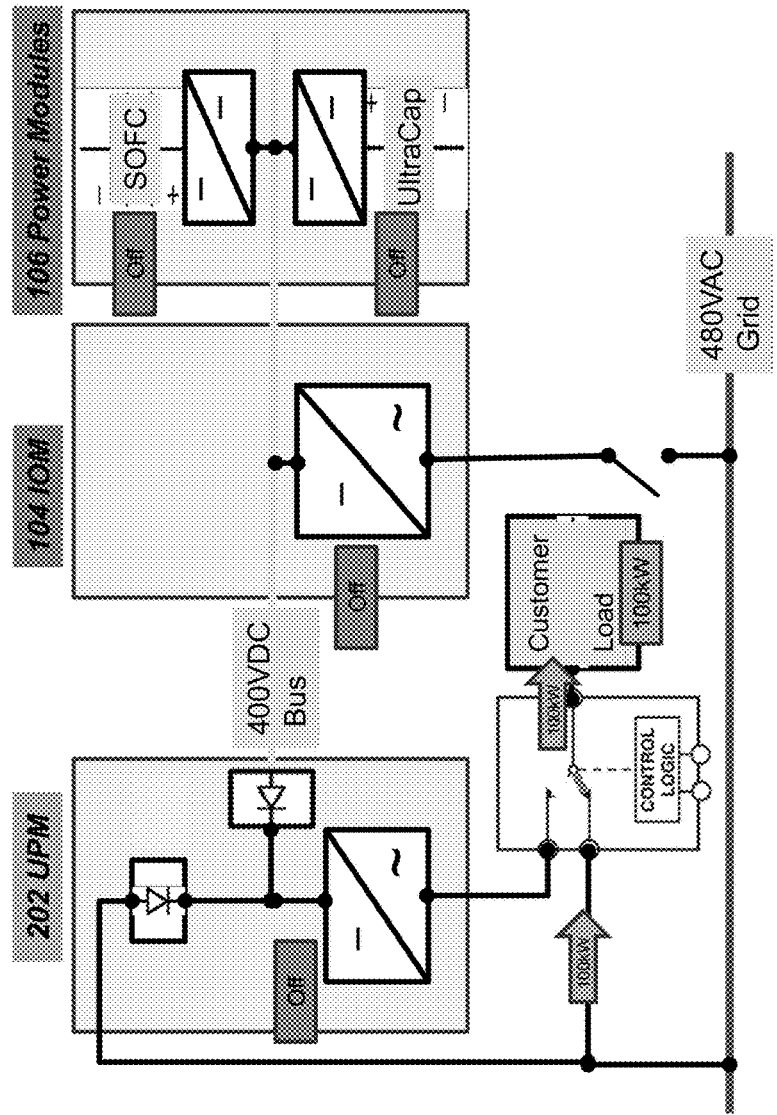
FIG. 2B - Installation / Load From Grid

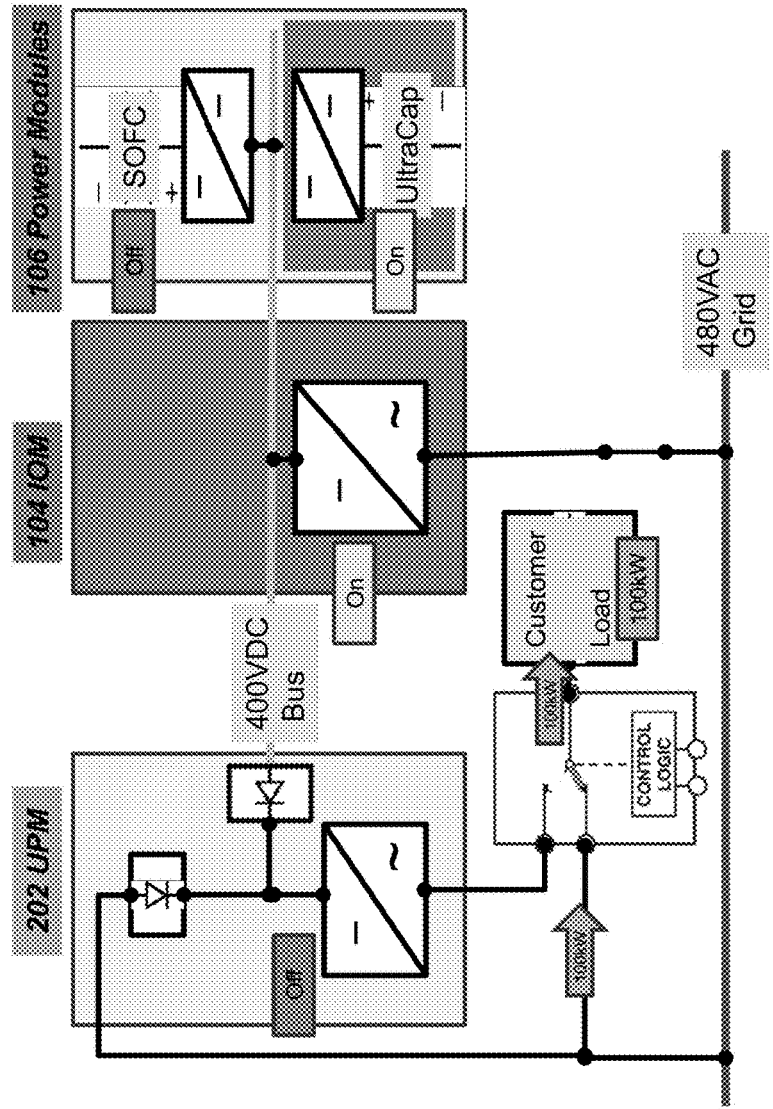
FIG. 2C - IOM Start-up / Charge Ultracap

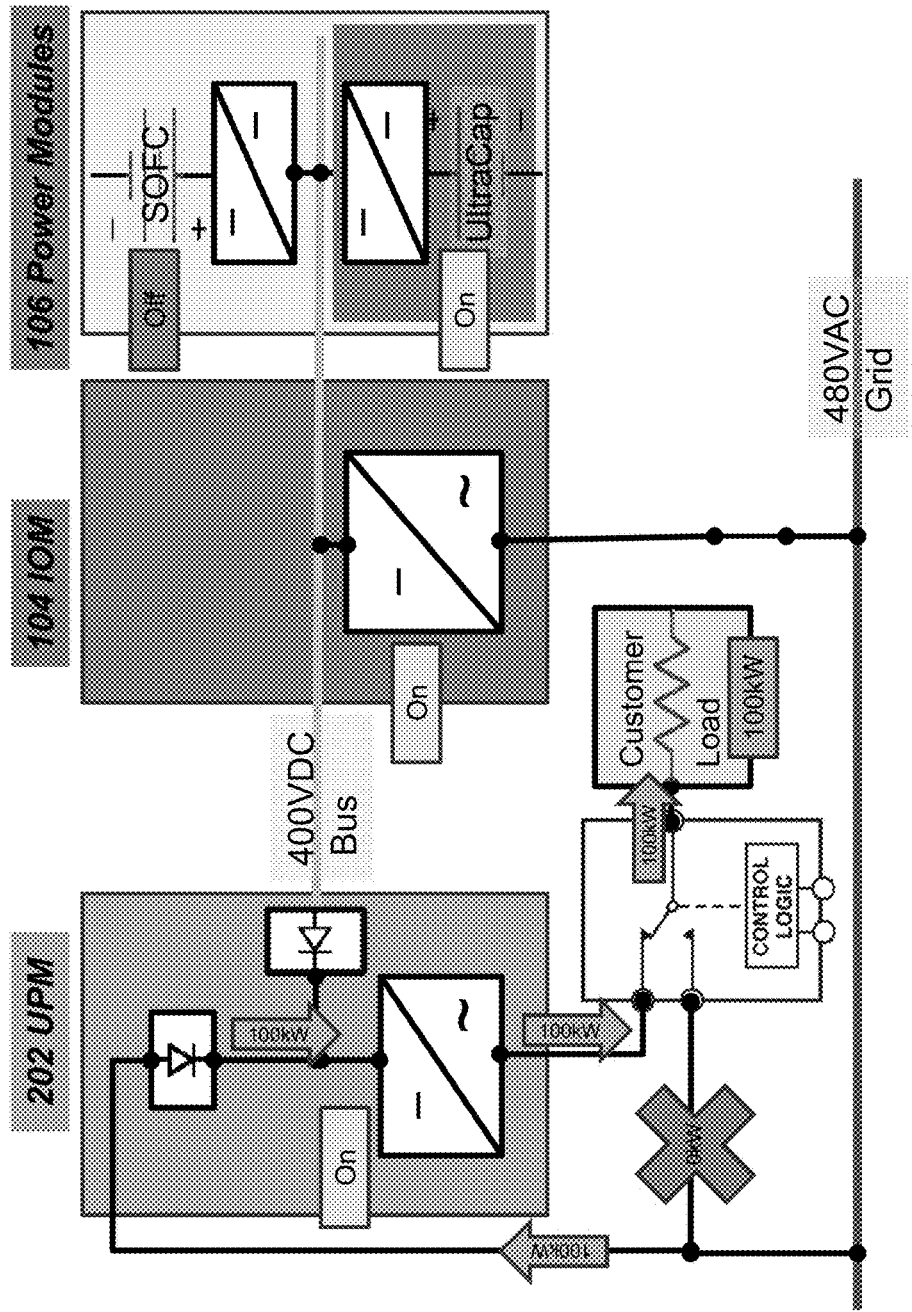

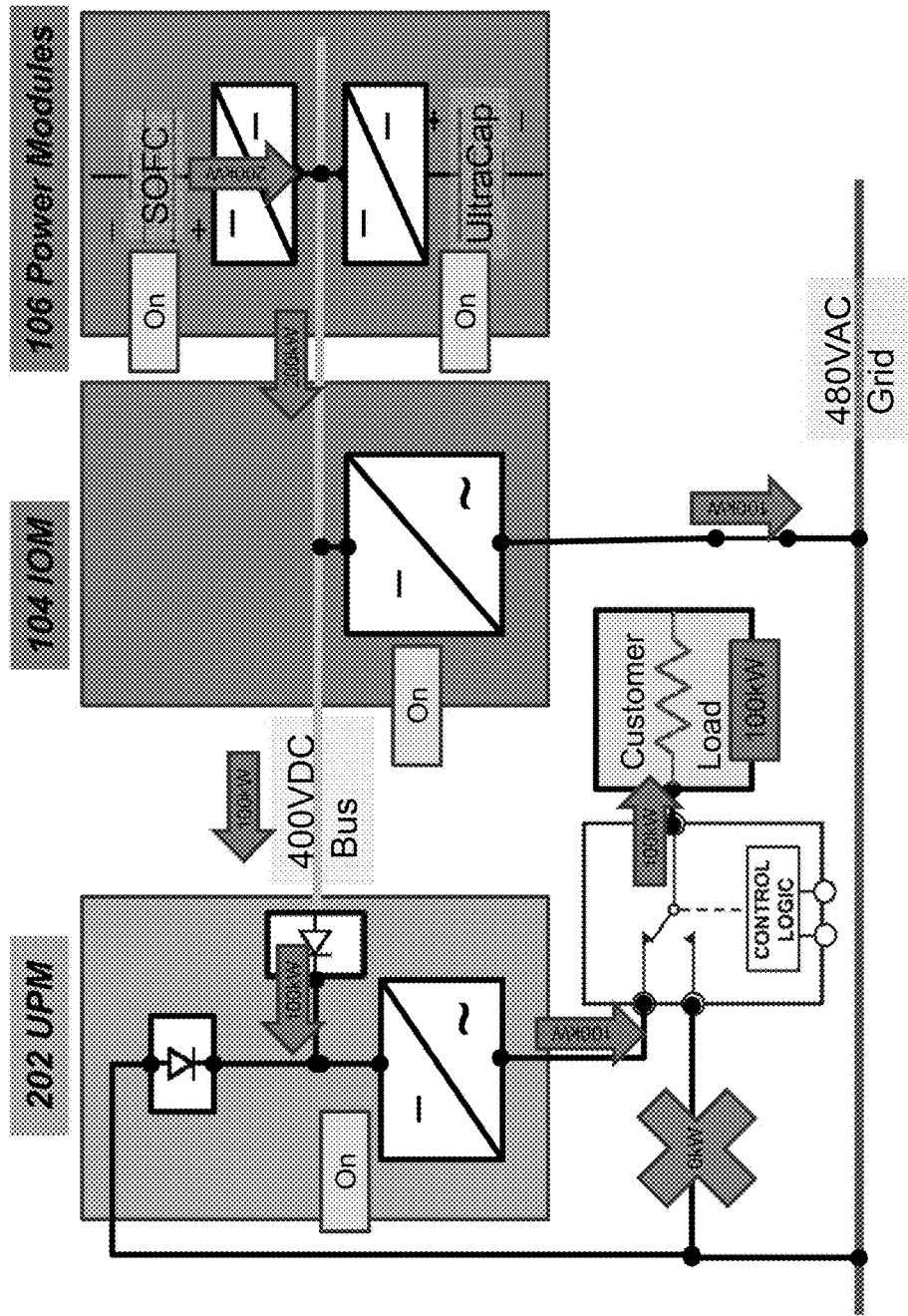
FIG. 2E - SOFC On / Normal Operation

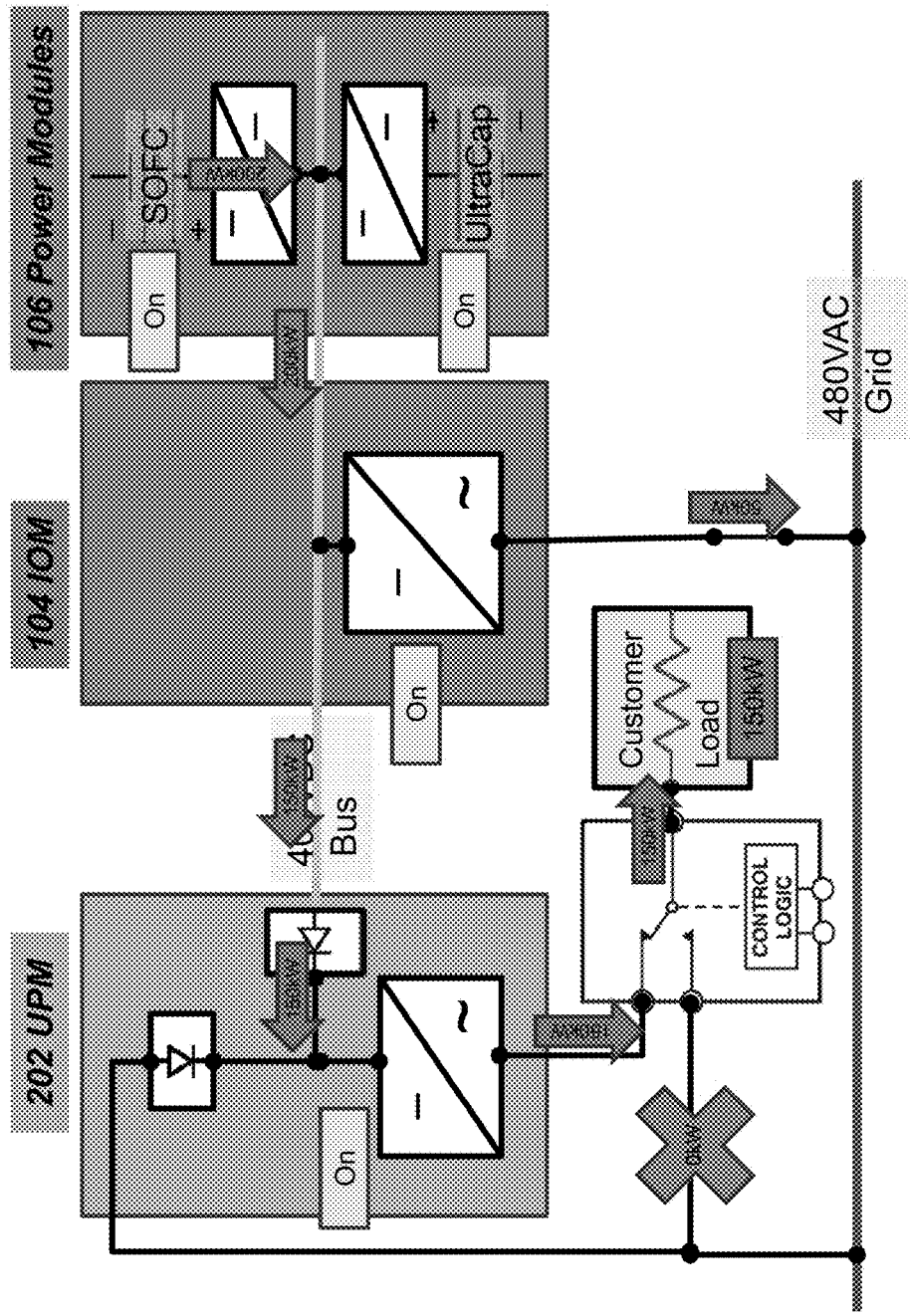
FIG. 2F - Customer Load Increase

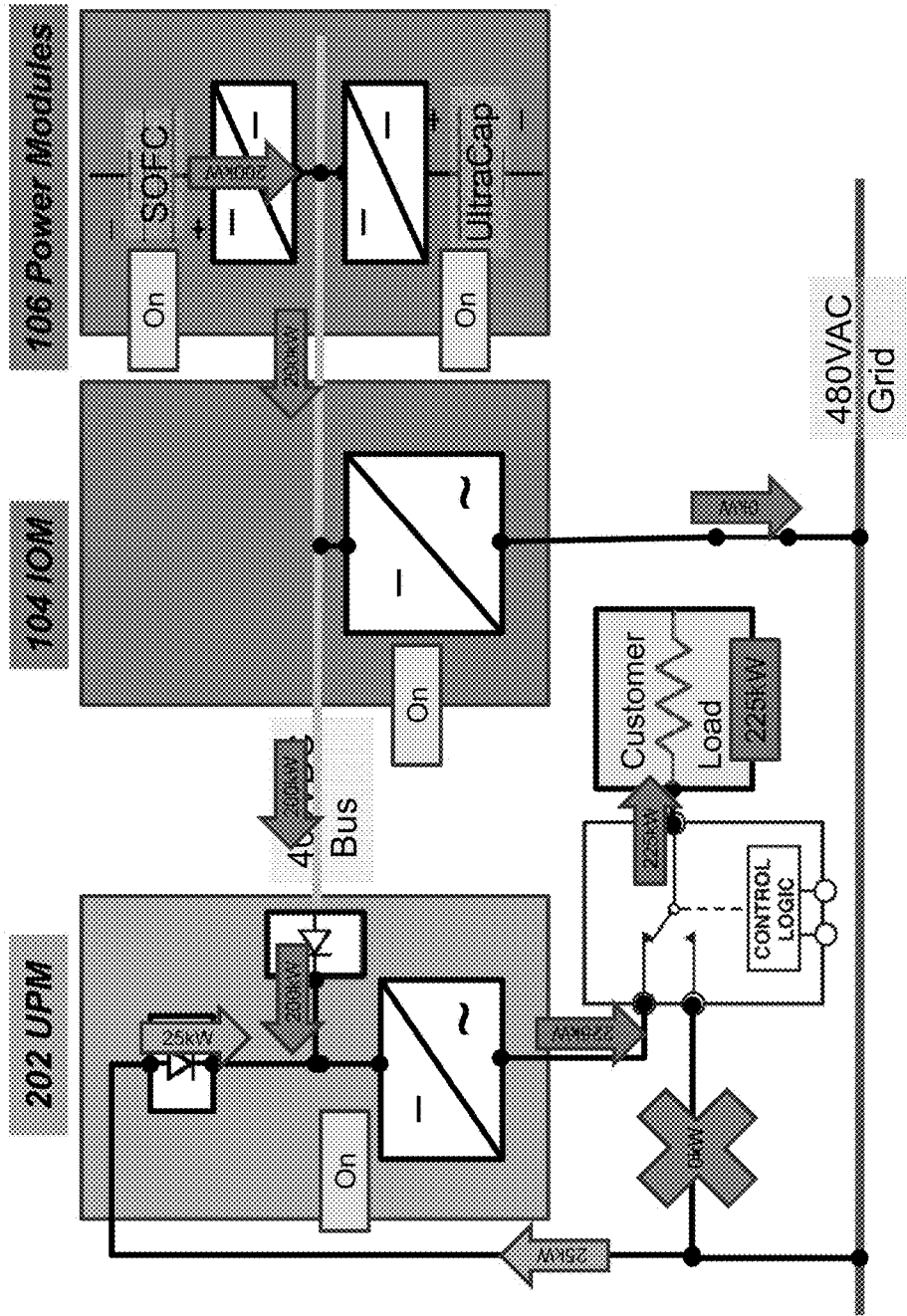
FIG. 2G - Customer Load Spike

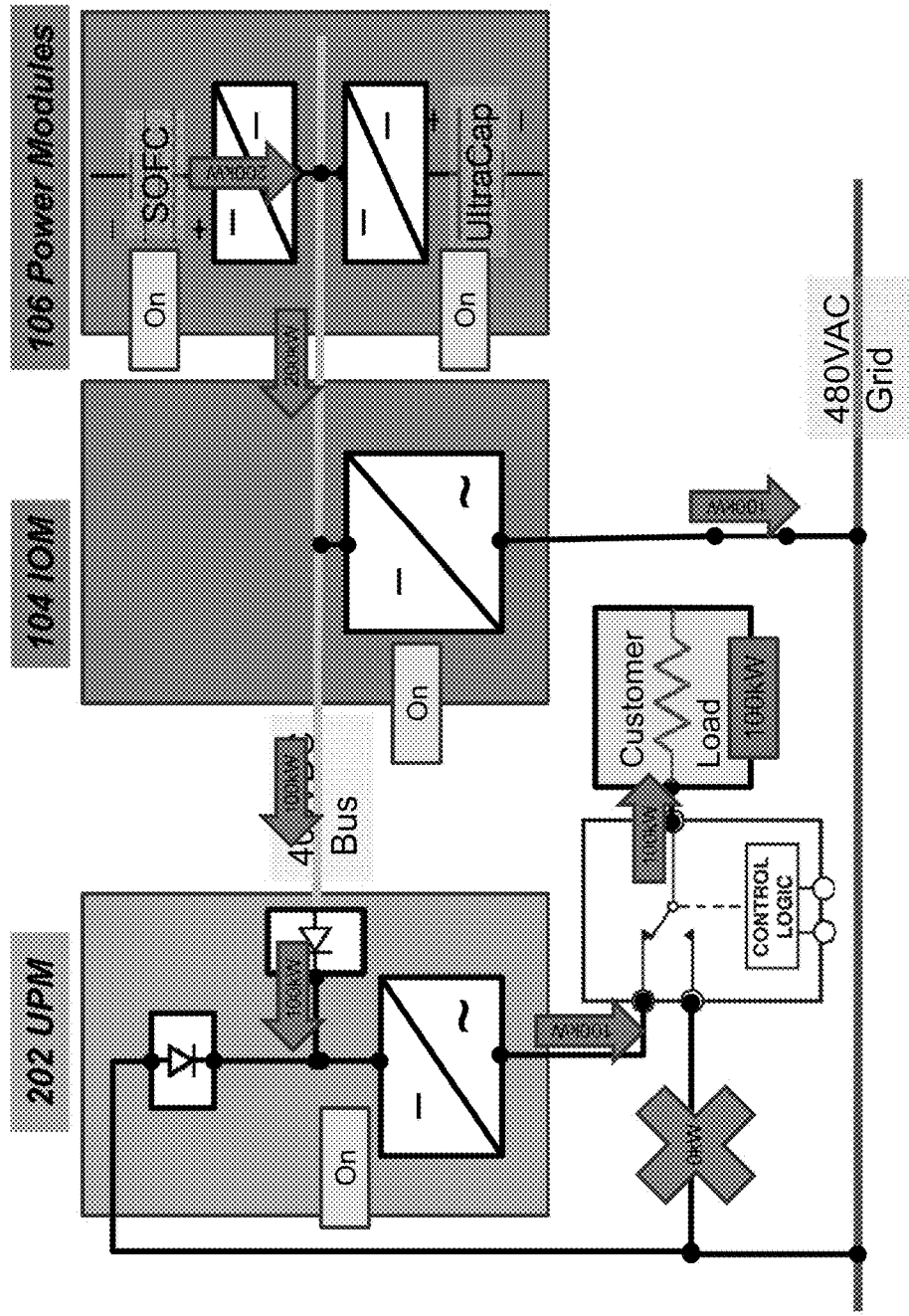
FIG. 2H - Back to Normal Operation.

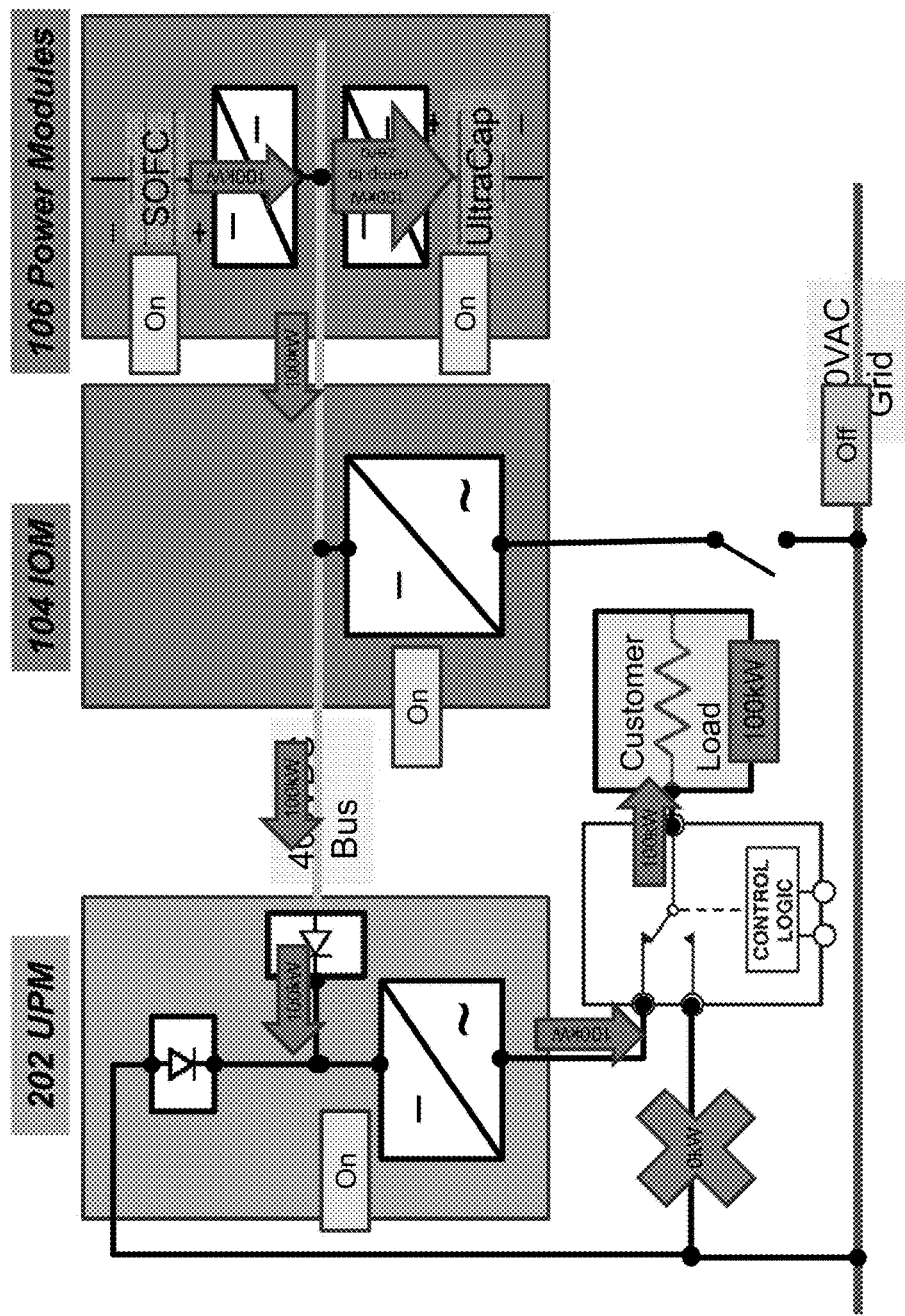
FIG. 2I - Loss of Grid / Ultracap Softens "Step"

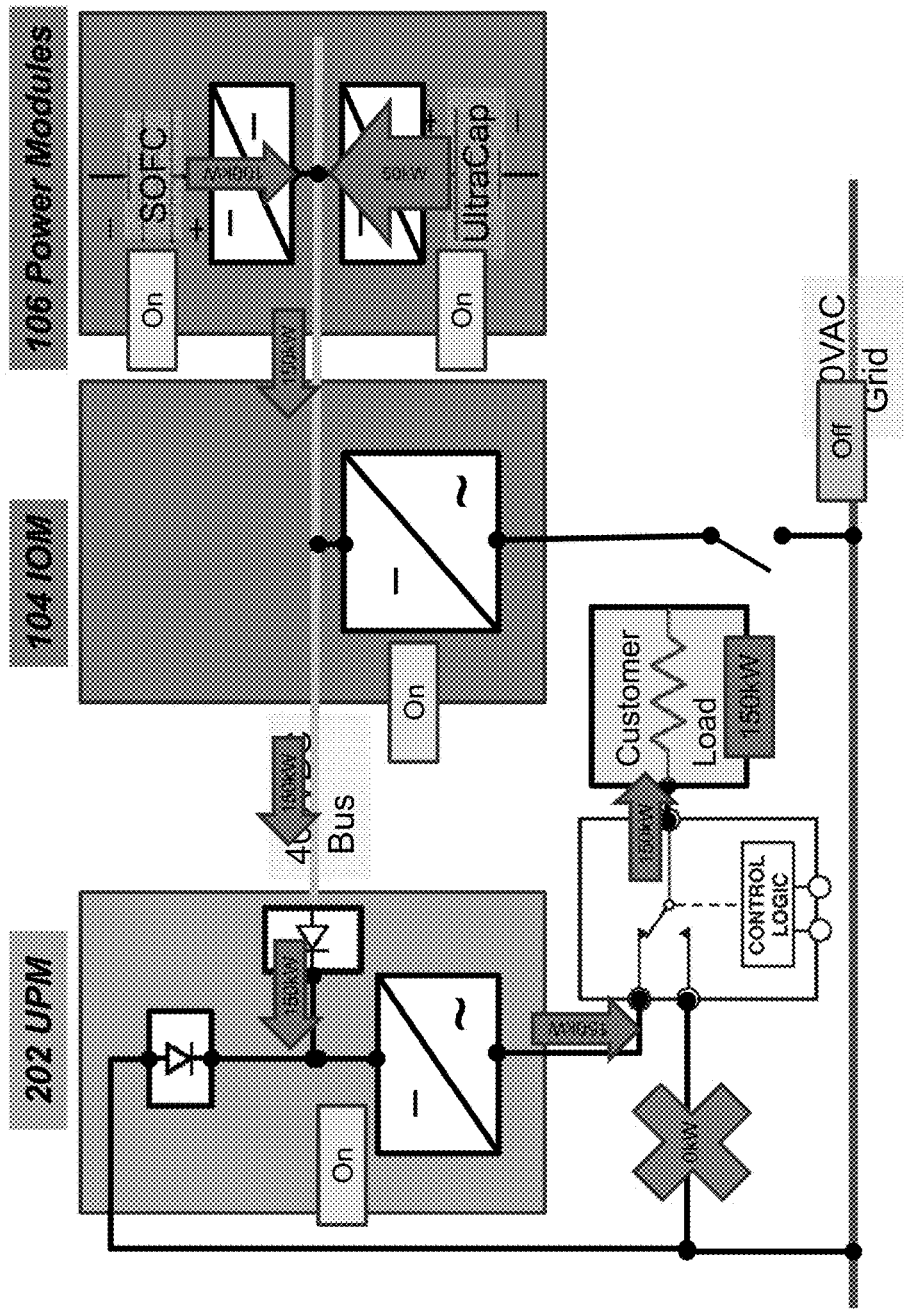

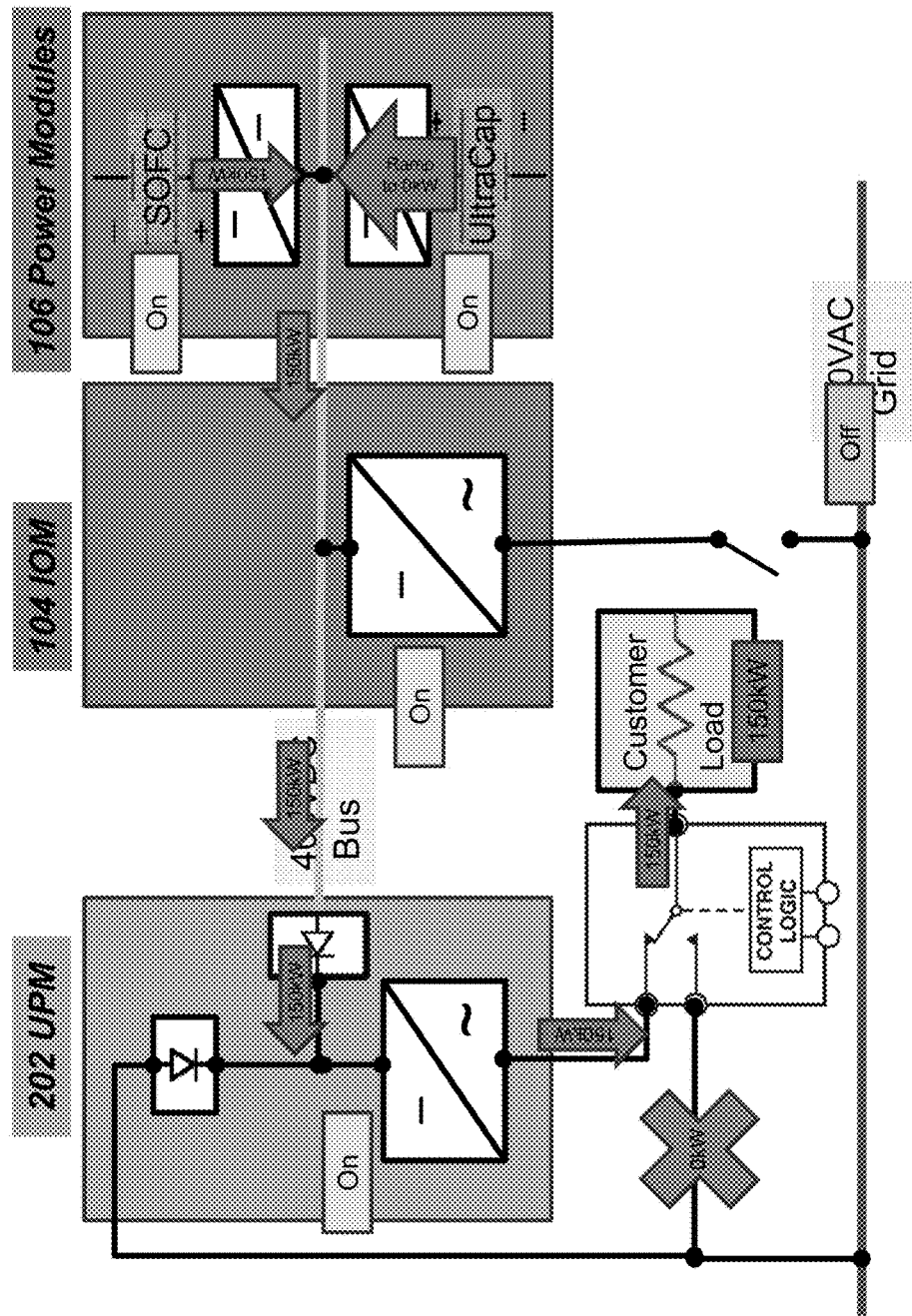
FIG. 2K - Load Transient w/o Grid (part 2)

SYSTEMS AND METHODS FOR PROVIDING FUEL CELL POWER TO A DATA CENTER

CROSS-REFERENCE TO RELATED APPLICATION

This application claims the benefit of priority to U.S. Provisional Patent Application No. 61/613,851, filed Mar. 21, 2012, and to U.S. Provisional Patent Application No. 61/789,343, filed Mar. 15, 2013, the entire contents of which are incorporated herein by reference.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their DC output into an alternating current (AC). As a result, synchronization of alternative power sources is required.

In addition, many alternative power sources use machines such as pumps and blowers which run off auxiliary power. Motors for these pumps and blowers are typically 3-phase AC motors which may require speed control. If the alternative power source generates a direct current (DC), the direct current undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

Operating individual distributed generators such as fuel cell generators both with and without a grid reference and in parallel with each other without a grid reference is problematic in that switch-over from current source to voltage source must be accommodated. Additionally, parallel control of many grid independent generators can be problematic.

To address the mode mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. Pat. No. 8,232,676 (filed May 2, 2008 and entitled "Uninterruptible Fuel Cell System"), the disclosure of which is incorporated herein by reference in its entirety for all purposes.

Another approach is to drop power for 5-10 cycles to switch modes. If a single inverter is used, a time of 5-10 cycles would be required to drop grid tie and establish voltage mode control.

Yet another approach is to use frequency droop to control the amount of power sharing in grid tied export or in load stand alone output control.

SUMMARY

Embodiments include a power generation system that includes a power module comprising at least one fuel cell generator configured to generate an output power for powering a load, and a bypass mechanism comprising a first switch that is configured to close from an open state in 1-250 msec, and a second switch in parallel with the first switch, the bypass mechanism being electrically connected between the load and a second power source, wherein the first and second switches are normally open, and the first switch is configured to close in response to a fault event such that when the first switch is closed power is provided from the second power source through the first switch to the load, and wherein the second switch is configured to close after a predetermined time after the first switch closes such that when the second switch is closed power from the second source is provided through the second switch to the load.

Further embodiments include a power module comprising at least one fuel cell generator configured to generate an output power for powering a load, a first switch connected between the power module and a first power feed of the load and configured to switch between a first state in which power is delivered to the first power feed of the load from the power module and a second state in which power is delivered to the first power feed of the load from a second power source, and a second switch connected between the power module and a second power feed of the load and configured to switch between a first state in which power is delivered to the first power feed of the load from the power module and a second state in which power is delivered to the first power feed of the load from a second power source, wherein at least one of the first switch and the second switch is configured to switch between the first state and the second state within 1-250 msec in response to a fault event Further embodiments include a method of providing power to a load that includes operating a power module comprising at least one fuel cell generator to provide output power to a load, closing a first switch in 1-250 msec in response to a fault event to provide power to the load through the first switch from a second power source, and closing a second switch, located in parallel with the first switch, after a predetermined time to provide power to the load through the second switch from the second power source.

Further embodiments include a method of providing power to a load that includes operating a power module comprising at least one fuel cell generator to provide output power to a first power feed of a load via a first switch and to a second power feed of a load via a second switch, wherein the first switch and the second switch are configured to select between the power module output and the output of a second power source, and actuating at least one of the first switch and the second switch in 1-250 msec in response to a fault event to transition between the power module output and the output of the second power source.

Further embodiments include a method of providing power to a plurality of loads that includes prioritizing the plurality of loads, connecting the loads to buses based on the load priority, connecting fuel cell power modules to the buses to provide a desired redundancy factor for the loads on each bus, and operating the fuel cell power modules to provide power to the loads via the buses.

Further embodiments include a system for providing power to a plurality of loads that includes a plurality of fuel cell power modules, a plurality of power buses configured such that one or more loads may be connected to each bus and one or more fuel cell power modules may be connected to each bus to provide output power to the loads, and a controller, coupled to the plurality of fuel cell power modules and the plurality of buses and having a processor configured with processor-executable instructions to perform operations comprising prioritizing the plurality of loads, connecting the loads to the plurality of buses based on the load priority, connecting at least one fuel cell power module to each bus to provide a desired redundancy factor for the loads on each bus, and operating the fuel cell power modules to provide power to the loads via the buses.

DESCRIPTION OF THE DRAWINGS

FIGS. 1A-1C are block diagrams illustrating a system according to embodiments of the invention.

FIGS. 2B to 2K illustrate the system of FIG. 2A in various modes of operation.

DETAILED DESCRIPTION

Figure 1B:
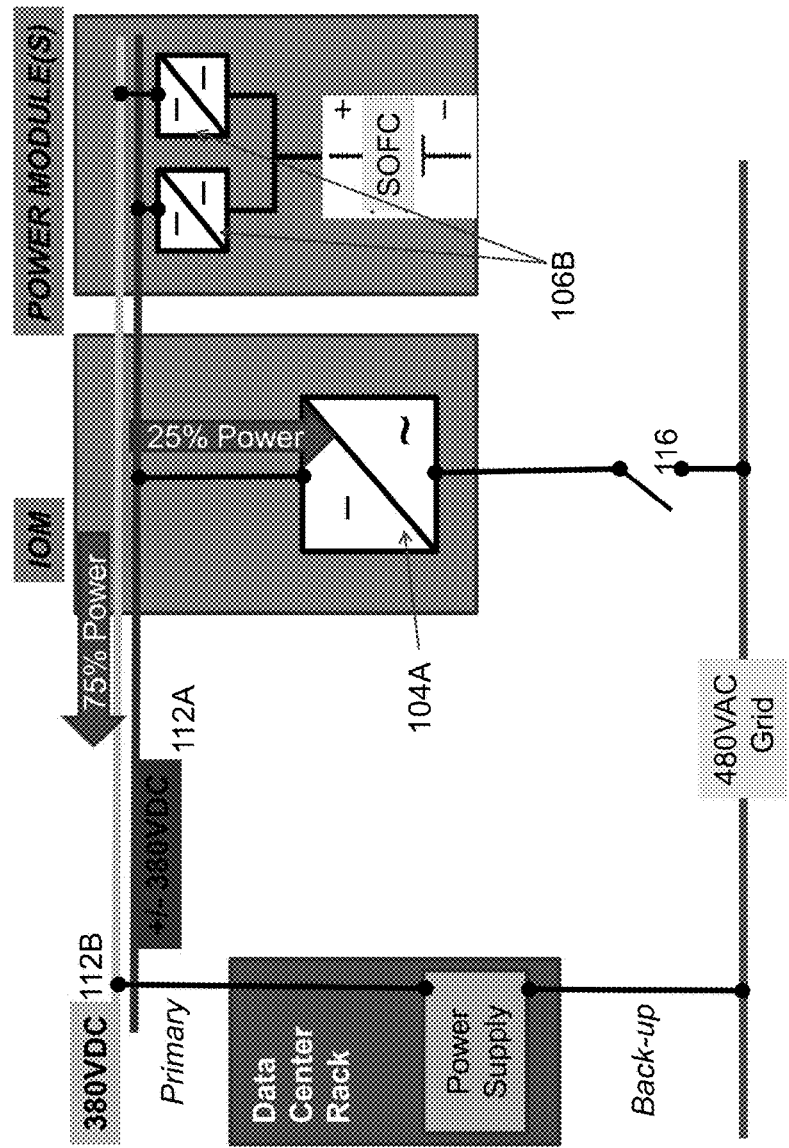

Referring to FIG. 1A, a fuel cell system according to an embodiment includes a DC load 102, such as a data center (i.e., an information technology (IT) system load including one or more of computer server(s), router(s), rack(s), power supply connections and other components found in a data center), an input/output module (IOM) 104 and one or more power modules 106.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to one or more the DC buses 112 such as split DC bus(es), by one or more DC/DC converters 106B located in module 106. The DC/DC converters 106B may be located in the IOM 104 instead of the power modules 106.

The system may also optionally include an energy storage module 108, such as a bank of supercapacitors or batteries. The storage device may also be connected to the DC bus 112 using one or more DC/DC converters as shown in FIG. 1A. Alternatively, the storage devices may be located in the power module 106 and together with the load 102.

As shown in FIG. 1B, the bus 112 may comprise a bipolar DC bus 112A and a unipolar DC bus 112B, such that one or more power modules 106 (or columns in one module) are connected to bus 112A and one or more other power modules (or other columns in one module) are connected to bus 112B. Bus 112A is connected to the DC load 102, while bus 112B is connected to an inverter 104A in IOM 104. The output from the inverter is provided to the grid 114 or to an AC load.

The fuel cell system and the grid 114 may be electrically connected to the power supply 102A of the load 102. Power supply may include using a control logic unit and a AC/DC converter to convert back up power from the grid 114 to DC power in case power from modules 106 is not available or not sufficient. Logic unit may be a computer or processor which switches power between the primary power from bus 112A and backup power from grid 114 using a switch or relay.

A second switch 116 controls the electrical connection between the IOM 104 and the grid 114. Switch 116 may controlled by the control logic unit or by another system controller.

Figure 1C:
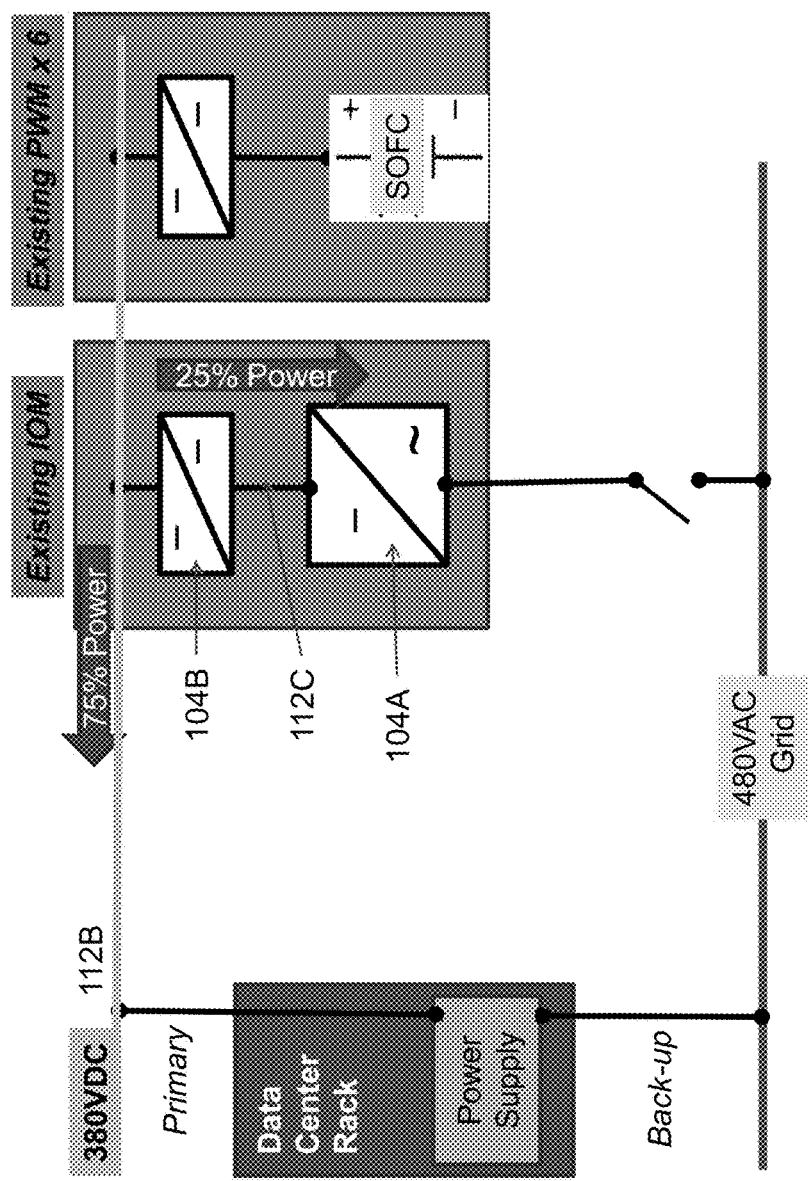

FIG. 1C illustrates an alternative embodiment of the invention, where all power modules 106 are connected in parallel to a single unipolar DC bus 112B. Bus 112B provides power to the load 102 and to the DC/DC converter 104B of IOM 104. A bipolar bus 112C connects converter 104B with inverter 104A in IOM 104.

Figure 2A:
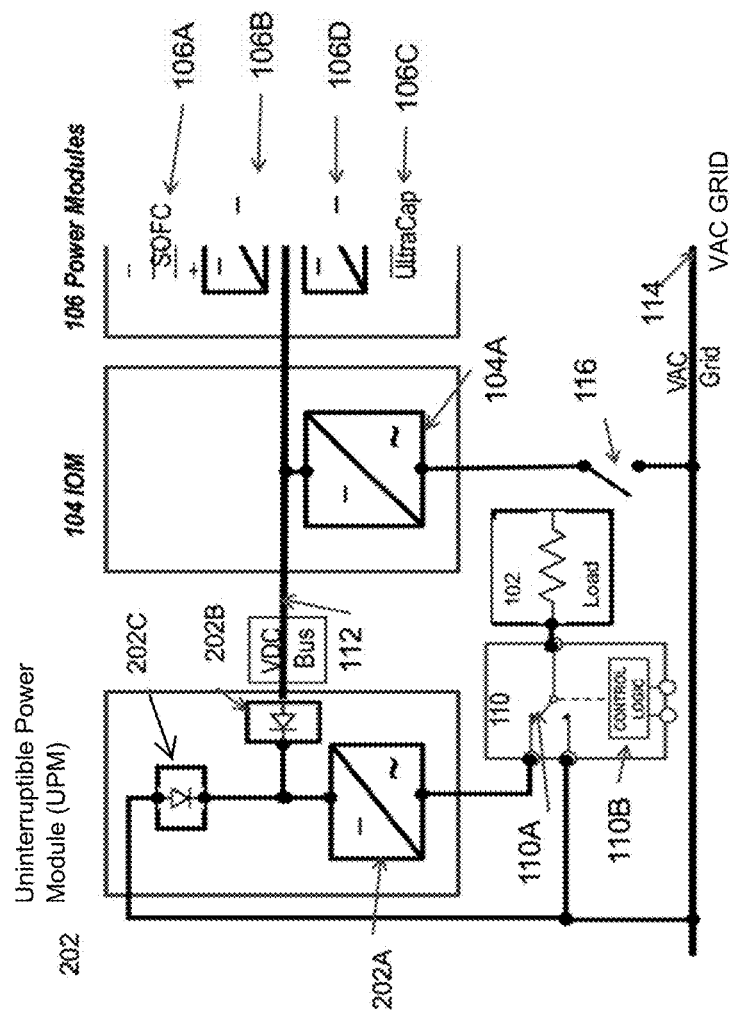
FIG. 2A is a block diagram illustrating a system according to an embodiment of the invention.

Referring to FIG. 2A, a fuel cell system according to an embodiment includes an uninterruptable power module (UPM) 202, an input/output module (IOM) 104 and one or more power modules 106. The power module 106 comprises a first housing, the IOM 104 comprises a second housing which is separate from the first housing, and the uninterruptible power module 202 comprises a third housing which is separate from the first and the second housings. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 202 includes at least one DC/AC inverter 202A. If desired, an array of inverters may be used. Any suitable inverter known in the art may be used. The UPM 202 optionally contains an input rectifier, such as an input diode 202B which connects to the output of a DC bus 112 from the power module(s) 106 and to the input of the at least one inverter 202A. The UPM also optionally contains a boost PFC rectifier 202C which connects to the output the electric grid 114, such as a utility grid, and to the input of the at least one inverter 202A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the IOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 202 is connected to an input/output module (IOM) 104 via the DC bus 112. The DC bus receives power from power modules 106.

The fuel cell system and the grid 114 are electrically connected to a load 102 using a control logic unit 110. The load may comprise any suitable load which uses AC power, such as one or more buildings, appliances, lights, tools, air conditioners, heating units, factory equipment and machinery, power storage units, computers, security systems, etc. The load 102 may be a data center (i.e., an information technology (IT) system load including one or more of computer server(s), router(s), rack(s), power supply connections and other components found in a data center). The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 102 either from the UPM 202 or from the grid 114 using switch 110A. The at least one fuel cell segment 106A and storage device 106C from module 106 are electrically connected in parallel to the at least one first inverter 104A in IOM and to the at least one second inverter 202A in the UPM 102. The at least one first inverter 104A is electrically connected to the load 102 through the electrical grid 114 using switch 110A in the first position. In contrast to the circuit shown in U.S. patent application Ser. No. 12/148,488 (filed May 2, 2008 and entitled "Uninterruptible Fuel Cell System"), the grid 114 in FIG. 1A is directly connected to the load 102 through the control logic unit 110 without passing through a bidirectional inverter. The at least one second inverter 202A is electrically connected to the load 108 with the switch 110A in the second position without using the electrical grid 114 (i.e., the output of the fuel cell segment 106A does not have to pass through the grid 114 to reach the load 102).

Thus, the control logic 110B selects whether to provide power to the load from the electrical grid 114 (or from the fuel cell segment 106A through the grid) or through the at least one second inverter 202A. The control logic 110B may determine a state of the power modules and select a source to power the load 102 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:
- A path to the load 102 from the AC grid 114.
- A path from the AC grid 114 through the IOM 104 to storage elements 106C of power modules 106 (for example, supercapacitors or batteries).
- A path from the storage elements 106C of the power modules 106, over the DC bus 112 to the IOM 104 and the UPM 202 in parallel. The DC bus delivers DC to the inverter in the UPM 202. The inverter 102A in the UPM 202 or inverter 104A in IOM 104 delivers AC power to the load 102 depending on the position of the switch 110A.
- A path from the power modules 106 (which may include power from the fuel cell segment(s) 106A and/or the storage elements 106C of the power modules 106), over the DC bus 112 to the IOM 104 and the UPM 202. The DC bus delivers DC voltage to the inverter in the UPM 202. The inverter 202A in the UPM 202 delivers AC power to the load 102. Power in excess of the power required by the load 102 is delivered to the AC grid through an inverter 104A in the IOM 104. The amount of power that is delivered to the AC grid 114 will vary according the demands of the load 102. If the amount of power required by the load 102 exceeds the power provided by the power modules 106, the additional power demand may be supplied by the AC grid 114 directly to the load 102 through switch 110A in the first position or to the UPM 202 with the switch 110A in the second position. The grid power is rectified in rectifier 202C in UPM 202 and provided to the inverter 202A in the UPM 202 and converted back to AC for powering the load 102.

FIGS. 2B-2K illustrate various modes of operation of the system shown in FIG. 2A. While the embodiments described below illustrate a load 102 which requires 100 kW of power and the fuel cell segment(s) 106A which output 200 kW of power in steady state, these values are provided for illustration only and any other suitable load and power output values may be used.

FIG. 2B illustrates the system operation during the installation of the system and/or during a period when the load 102 receives power from the grid 114. As shown in this figure, the fuel cell segment(s) 106A and the energy storage device 106C are in the OFF state, the IOM 104 inverter 104A and the UPM inverter 202A are both in the OFF state and the second switch 116 is open such that there is no electrical communication between the IOM and the grid. The control logic switch 110A is in the first position to provide power from the grid 114 to the load 102 through the control logic module 110. As shown in the figure, 100 kW of power is provided from the grid to the load through the control logic module.

FIG. 2C illustrates the system operation during IOM start-up and charging of the energy storage device (e.g., bank of supercapacitors) 106C from the grid 114 while the load 102 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 202A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 102 through the control logic module 110. As shown in the figure, 100 kW of power is provided from the grid to the load through the control logic module.

FIG. 2D illustrates the system operation during UPM start-up following IOM start-up. UPM functions by receiving power from the energy storage device 106C. UPM provides the power from the energy storage device 106C to the load 102. As shown in this figure, the fuel cell segment(s) 106A are in the OFF state while and the energy storage device 106C is in the ON state. The IOM 104 bi-directional inverter 104A is in the ON state and the UPM inverter 202A is in the ON state. The second switch 116 is closed such that there is electrical communication between the IOM and the grid. The control logic switch 110A is in the second position to provide power from the UPM 202 to the load 102 through the control logic module 110. As shown in the figure, 100 kW of power is provided from the grid 114 to the load 102 through the rectifier 202C and inverter 202A of the UPM 202 and then through the control logic module. Some power may also be provided to the load 102 from the energy storage device 106C via the DC bus 112, UPM 202 and control logic module.

FIG. 2E illustrates the steady state operation of the system. In this mode the fuel cell segment(s) 106A is in the ON state to power the load 102. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 202A is in the ON state. The 200 kW power output is split between the grid 114 and the load 102. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 202A of the UPM 202 and then through the control logic module 110 to the load 102. Preferably, this 100 kW of power does not pass through the IOM inverter 104A and/or the grid 114 to reach the load 102. While a 200 kW power output split 50/50 between the grid and the load is described above, different power outputs may be used as needed, such as 25 kW to 1000 kW, which may be split 10/90 to 90/10 between the grid and the load.

FIG. 2F illustrates operation of the system during a relatively steady load 102 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 102. As shown in this figure, the energy storage device 106C is in the ON state to act as an emergency backup power source. The IOM 104 bi-directional inverter 104A is in the ON state and the UPM inverter 202A is in the ON state. The second switch 116 is closed such that there is electrical communication between the IOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through IOM 104 and through the inverter 202A of the UPM 202 and then through the control logic module 110 to the load 102. Thus, the power output of the fuel cell segment(s) 106A is preferably split between the grid and the load in this mode. Preferably, the power does not pass through the IOM inverter 104A and/or the grid 114 to reach the load 102.

FIG. 2G illustrates operation of the system during a sudden load 102 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 102. As shown in this figure, the energy storage device 106C is in the ON state to act as an emergency backup power source. The IOM 104 bi-directional inverter 104A is in the ON state and the UPM inverter 202A is in the ON state. The second switch 116 is closed such that there is electrical communication between the IOM and the grid. However, no power is provided from fuel cell segment(s) 106A through the IOM inverter 104A to the grid 114 due to the load spike. The control logic switch 110A is in the second position to provide power from the fuel cell segment(s) 106A in the power module 106 and from the grid 114 through the DC bus passing through IOM 104 and through the inverter 202A of the UPM 202 and then through the control logic module 110 to the load 102. In this mode, the power to the load is provided from both the fuel cell segment(s) and the grid. As shown, 200 kW from the segment(s) 106A is provided through the DC bus 112, diode 202B, inverter 202A and switch 110A to the load 102, while 25 kW is provided from the grid 114 through the rectifier 202B, inverter 202A and switch 110A to the load 102 to achieve a total 225 kW of power required by the load. Preferably, the power from the fuel cell segment(s) does not pass through the IOM inverter 104A and/or the grid 114 to reach the load 102.

FIG. 2H illustrates operation of the system during a return to normal or steady state operation after the sudden load 102 spike. The fuel cell segment(s) 106A is in the ON state to power the load 102. As shown in this figure, the energy storage device 106C is in the ON state to act as an emergency backup power source. The IOM 104 bi-directional inverter 104A is in the ON state and the UPM inverter 202A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 202A of the UPM 202 and then through the control logic module 110 to the load 102. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 202B, inverter 202A and switch 110A to the load 102. Preferably, the power does not pass through the IOM inverter 104A and/or the grid 114 to reach the load 102.

FIG. 2I illustrates operation of the system during loss of power from the grid 114 (e.g., during a black out). The fuel cell segment(s) 106A is in the ON state to power the load 102. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 202A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 202A of the UPM 202 and then through the control logic module 110 to the load 102. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 202B, inverter 202A and switch 110A to the load 102. The power output of the segment(s) 106A is then gradually reduced to 100 kW to meet the requirements of the load 108.

FIG. 2J illustrates operation of the system during loss of power from the grid 114 (e.g., during a black out) and in case of a load transient (e.g., increased demand for power from load 102) while the fuel cell segment(s) output a reduced amount of power (e.g., 100 kW) which meets the steady state requirements of the load. The fuel cell segment(s) 106A is in the ON state to power the load 102. As shown in this figure, the energy storage device 106C is in the ON state to provide additional power to the load 102. The IOM 104 bi-directional inverter 104A is in the ON state and the UPM inverter 202A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 202A of the UPM 202 and then through the control logic module 110 to the load 102. In this mode, 100 kW from the segment(s) 106A and 50 kW from the energy storage device is provided to the DC bus 112. Thus, the DC bus 112 provides the 150 kW of power from IOM 104 through diode 202B, inverter 202A and switch 110A to the load 102. Preferably, the power does not pass through the IOM inverter 104A and/or the grid 114 to reach the load 102.

FIG. 2K illustrates operation of the system during loss of power from the grid 114 (e.g., during a black out) and in case of a continuing load transient (e.g., continued increased demand for power from load 102). The operation is the same as that shown in FIG. 2J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 102 by the fuel cell segment(s). Thus, the energy storage device acts as a bridging power source during the initial load transient and is then phased out during the continuing load transient.

Figure 3:
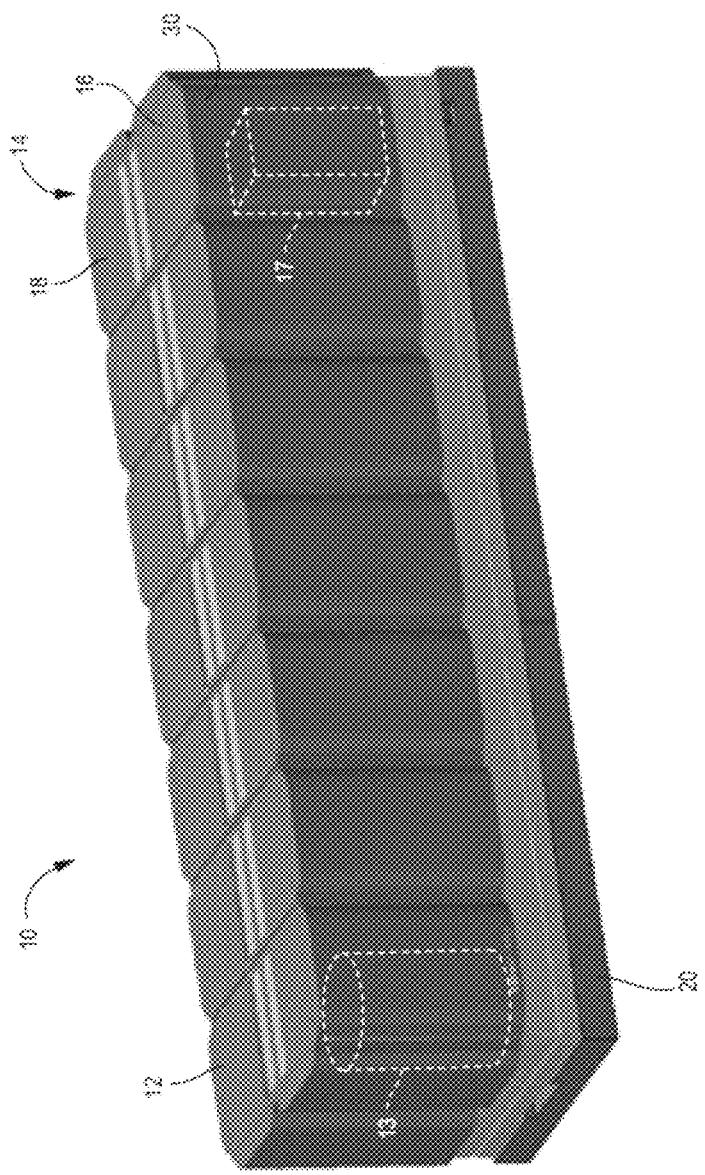
FIG. 3 is an isometric view of a modular fuel cell system enclosure that can be used with the exemplary embodiments.

Referring to FIG. 3, a modular fuel cell system enclosure 10 is shown according to an exemplary embodiment. This modular system is referred to as a "Bloom Box" or "Bloom Energy Server." The modular system may contain modules and components described above as well as in U.S. patent application Ser. No. 11/656,006, filed on Jan. 22, 2007, and incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes a plurality of power modules 12 (which are labeled 106 in FIGS. 1A-2K), one or more fuel input (i.e., fuel processing) modules 16, and one or more power conditioning (i.e., electrical output) modules 18 (which are labeled 104 and referred to as "IOM" in FIGS. 1A-2K). For example, the system enclosure may include any desired number of modules, such as 2-30 power modules, for example 6-12 power modules. FIG. 3 illustrates a system enclosure 10 containing six power modules 12 (one row of six modules stacked side to side), one fuel processing module 16, and one power conditioning module 18 on a common base 20. Each module 12, 16, 18 may comprise its own cabinet. Alternatively, as will be described in more detail below, modules 16 and 18 may be combined into a single input/output module 14 located in one cabinet. While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 3, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in the preferred embodiment, the input/output module 14 is at the end of the row of power modules 12, it could also be located in the center of a row power modules 12.

The modular fuel cell system enclosure 10 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to an exemplary embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

The following embodiments describe powering a load using a backup bypass to ensure continuous power to a critical load. The load may be connected to a first power source, such as a distributed fuel cell power generation system, as described above, and may also be connected to a second power source, such as a grid source, via at least two switches in parallel, at least one of which is a fast-acting switch (e.g., configured to close in less than about 250 msec, such as 1-200 msec, including about 20-100 msec), which may be a solid state switch. The load may be powered by the first power source during normal operation. If the first power source output fails or has a power drop, or the load has a load spike or fault, then the solid state switch is closed and power is provided to the load from the second power source through the solid state switch. After a pre-determined time, power is provided to the load from the second power source through a second switch, and the solid state switch is opened.

Figure 4A:
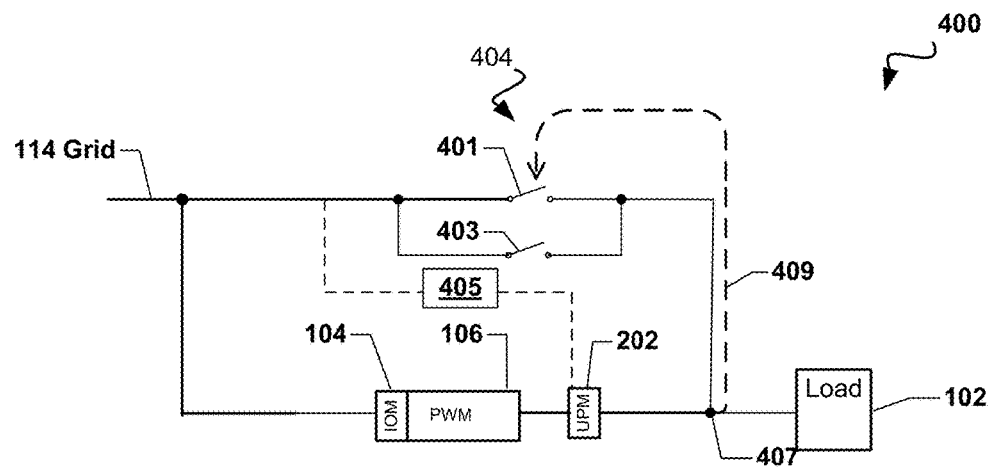
FIG. 4A schematically illustrates a system for powering a load using a fuel cell power module that includes a bypass mechanism according to one embodiment.

FIG. 4A illustrates an embodiment system 400 for powering a load 102, which may be an information technology (IT) load, such as a data center IT load (i.e., devices operating in an IT system which may include one or more of computer(s), server(s), router(s), rack(s), power supply connections, and other components found in a data center environment). As described herein, an IT load (i.e., devices operating in an IT system which may include one or more of computer(s), server(s), router(s), rack(s), power supply connections, and other components found in a data center environment) and IT system are distinguished from devices, such as computers, servers, routers, racks, controllers, power supply connections, and other components used to monitor, manage, and/or control the operation of any DC power generators and DC power generation systems in that IT loads do not monitor, manage and/or control the operation of any DC power generators or DC power generation systems that provide power to the IT loads themselves.

The data center housing the IT load may comprise a rack that supports the various servers, routers, etc., and/or a building housing the IT load.

As shown in FIG. 4A, a load 102, such as a data center IT load, may be connected to one or more UPMs 202 (e.g., stand alone inverter or DC/DC converter outputs). The system 400 further includes at least one power module 106, which may be a fuel cell (e.g., SOFC) power module 106, and may include at least one "hot box" containing a plurality of fuel cell segments, as described above. The at least one power module 106 may provide at least a portion of its power output to the load 102 via the one or more UPMs 202. Each power module 106 may also have an associated IOM 104 including inverter(s) or DC/DC converter(s) tied to a campus or utility grid 115.

It may be advantageous to operate the at least one power module 106 to generate power in excess of the instantaneous power requirement of the load 102. For example, the fuel cells of the power module 106 may be heat-soaked to full or nearly-full load (e.g., the power module 106 is operated at greater than 80%, such as greater than 90%, or greater than 95%, such as 99-100% of its output capacity). The excess power generated by the at least one power module 106 and not required by the load 102 may be supplied (e.g., sold) to the grid 114 via the IOM 104. Alternatively or in addition, all or a portion of the excess power may be provided to one or more energy storage devices, such as an ultracapacitor or battery system (not shown), or to other loads in the system 400 (not shown).

The system 400 also includes a grid source 114, which may be an AC or DC campus or utility grid. The load 102 may be connected to the grid 114 via a by-pass mechanism 404 including a pair of switches 401, 403, connected in parallel between the grid 114 and the load 102. At least one of the switches 401 may be a first, fast-acting switch that may close from an open state in less than about 250 msec (e.g., 1-200 msec, such as about 20-100 msec). The fast-acting switch 401 may be a solid-state switch, such as a silicon-controlled rectifier (SCR) switch. In embodiments, a second switch 403, in parallel with the first fast-acting switch 401, may be a slower-acting switch in relation to the first fast-acting switch 401, and may be a mechanical switch (e.g., a relay, contactor or breaker) which may close from an open state in greater than 300 msec.

In operation of the system 400, the switches 401, 403 of the bypass mechanism 404 are normally open, and the load 102 receives power from the power module 106 via the UPM 202. In case of a fault event, such as where the power module 106 and/or UPM 202 output fails, or the load has a power spike or fault, the voltage at node 407 starts to collapse. This voltage drop may be sensed by the bypass mechanism 404 (schematically illustrated by arrow 409 in FIG. 4A), which causes the first fast-acting switch 401 to close so that the load 102 may be powered by the grid 114 via the bypass mechanism 404. Then, after a pre-determined time, the second, slower-acting switch 403 may close, and optionally the first switch 401 may re-open, so that the grid 114 power is provided to the load 102 via the second switch 403. This may minimize losses across the fast-acting switch 401 and prevent burn-out of a solid-state fast-acting switch 401. If normal power output is restored from the power module 106 and UPM 202, then the switch 403 may reopen and the load 102 may again be powered by the power module 106 via the UPM 202.

In the case where the grid source 114 is an AC grid source, the fast-acting switch 401 may be configured to close, and thus complete the transfer to grid 114 power, in a fraction of the AC power waveform cycle so that power to the load 102 may be substantially uninterrupted. In embodiments, the UPM 202 may include or be coupled to a synchronization circuit, schematically illustrated as 405 in FIG. 4A, that senses the grid voltage and adjusts the frequency and phase of the UPM 202 AC output voltage so that it is synchronized with the grid voltage. Thus, when the power to the load 102 switches between the UPM 202 output and the grid 114 output via the bypass mechanism 404, the two outputs are synchronized and little or no disruption is experienced by the load 102.

Figure 4B:
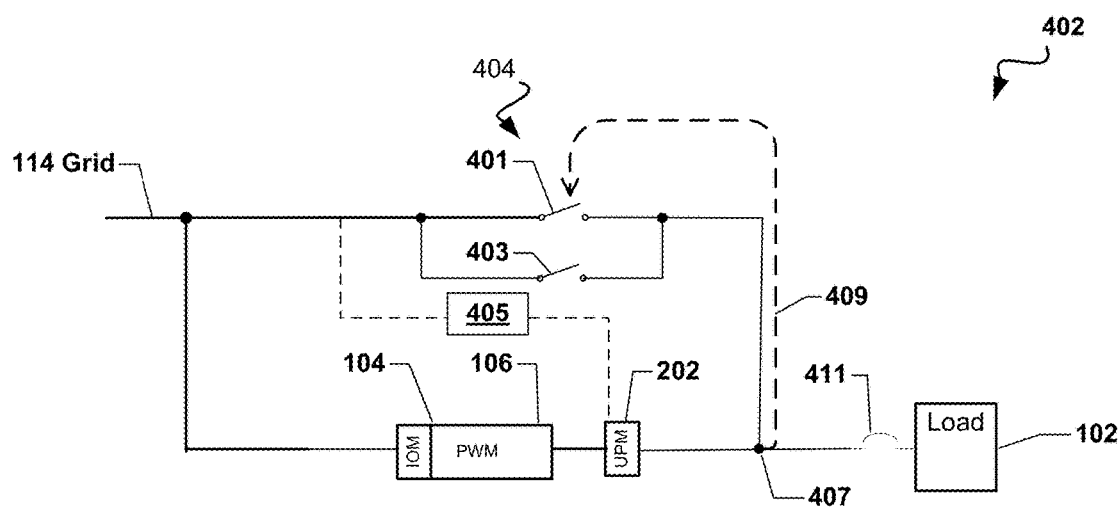
FIG. 4B schematically illustrates a system for powering a load using a fuel cell power module that includes a bypass mechanism and a fuse or circuit breaker according to another embodiment.

FIG. 4B illustrates another embodiment of a system 402 for powering a load 102 using a fuel cell power module 106 having a grid bypass mechanism 404. The system 402 of FIG. 4B is identical to the system 400 of FIG. 4A and also includes a circuit breaker or fuse 411 provided between the load 102 and the power module 106 and grid 114 sources. The circuit breaker/fuse 411 may provide an important safety function by detecting and clearing fault conditions experienced by the load 102. For example, in the case where the load 102 shorts to ground, a large amount of current may be drawn through the load 102 into ground. Normally, in such a situation, the current flow through the circuit breaker or fuse 411 is sufficient to open the circuit breaker (or, alternatively, to blow the fuse), stopping the flow of current to the load 102. However, when the power source is a distributed generator, such as a fuel cell power module 106 as shown in FIG. 4B, which may have a current output limit, the current through the circuit breaker or fuse 411 may not be sufficient to trip the circuit breaker or fuse 411, and thus current may continue to flow through the load 102 to ground, resulting in an unacceptable hazard condition.

In the system 402 of FIG. 4B, the above-described fault condition at the load 102 may be "cleared" via the bypass mechanism 404. In this case, a short to ground at the load 102 will cause the voltage at the node 407 to collapse, triggering the fast-acting switch 401 of the bypass mechanism 404 to close and power to be drawn from the grid 114. The grid 114 is typically not current limited like a fuel cell power module 106, and thus the current provided from the grid 114 is sufficient to trip the circuit breaker or fuse 411 and stop the flow of power to the load 102.

Figure 4C:
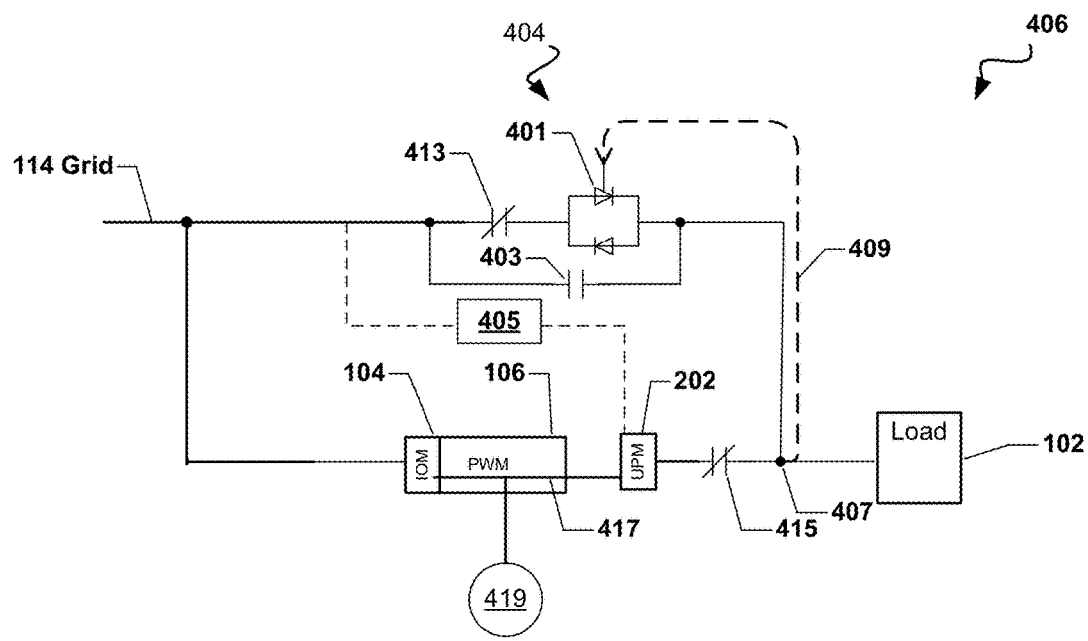
FIG. 4C schematically illustrates an implementation of the system of FIG. 4A.

FIG. 4C schematically illustrates one implementation of a system 406 for powering a load 102 using a fuel cell power module 106 having a grid bypass mechanism 404. In this embodiment, the first fast-acting switch 401 of the bypass mechanism 404 comprises a pair of silicon-controlled rectifiers (SCR) in parallel and oriented in opposite directions. The second slower acting switch 403 in this embodiment is a mechanical contactor (e.g., relay) that is normally open.

The first fast-acting switch 401 may be connected in series with a contactor 413, which may be normally closed. During power up or at other times when the fuel cell power module 106 is off-line, the contactor 413 may be opened and the second switch 403 may be closed so that the load 102 may be powered by the grid 114 via the second switch 403. Another contactor 415 may be located between the UPM 202 and the load 102. This contactor 415 may be normally closed, and may be opened to disconnect the power module 106 and UPM 202 from the load 102.

In various embodiments, the DC fuel cell generators of the power module 106 may be linked to the IOM 104 and UPM 202 via a bus 417, which may be a bi-polar (e.g., ±380 VDC) split bus. An alternative power source 419, which may be a distributed generator source, such as a solar or wind power source, a diesel generator or another fuel cell source, for example, may be connected to the bus 417 to provide power to the load 102 during startup of the fuel cell power module 106.

It will be understood that the above-described systems 400, 402, 406 are not limited to data centers, and any critical power site with access to a distributed power source, such as a fuel cell power module, and a grid power source, may utilize the present systems and methods for powering a load.

Figure 5:
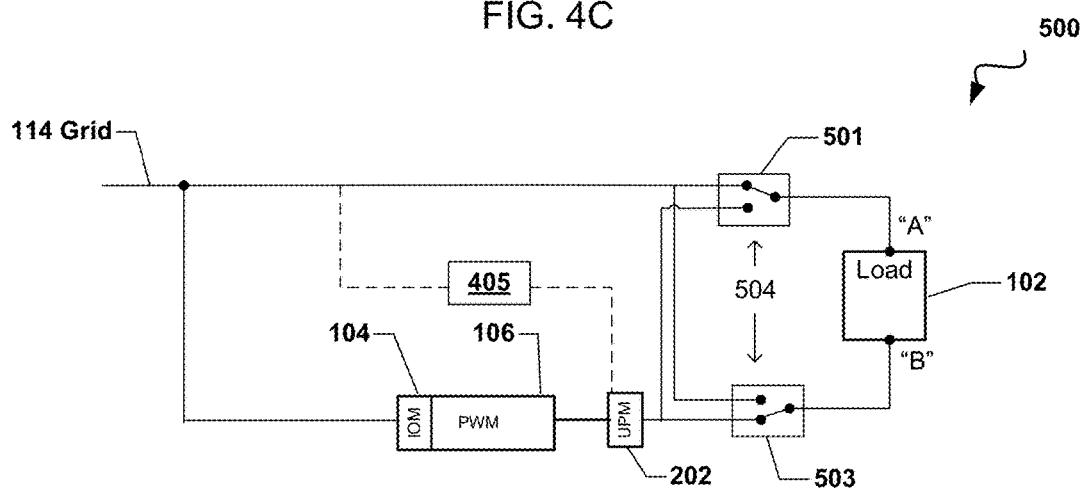
FIG. 5 schematically illustrates a system that includes a switching assembly for selecting between fuel cell power and grid power to ensure power delivery to a critical load.

FIG. 5 illustrates another embodiment of a system 500 including a switching assembly 504 that can select between fuel cell power and grid power to ensure power delivery to a mission critical load 102, such as a data center IT load. In this embodiment, the load 102 may be "dual corded" or "multi-corded," meaning that the load 102 receives power from multiple power feeds from different sources (e.g., "A" side feed, "B" side feed, "C" side feed, etc.). As shown in FIG. 5, the load 102 (e.g., a data center rack) may be dual corded having an "A" side feed and a "B" side feed. The load 102 may draw power from both feeds (e.g., 50% power from the "A" side feed, and 50% power from the "B" side feed). A transfer switch or static switch inside the load 102 may be power seeking and may maintain power to the load 102 (via one or both feeds) under all conditions. In some embodiments, the load 102 may include a dual corded power supply having two sets of AC/DC electronics inside (i.e., an "A" side power supply and a "B" side power supply) which may essentially have a diode-"or" at their output, and power may be drawn from whichever supply is lined up to a viable source. In this type of arrangement, a switch may not be required. The transition from one supply to the other, or power sharing in cases where power is shared between them, may be accomplished using solid state components. Thus the load comprises a dual corded power supply having two sets of power electronics that may draw power from at least one the A-side feed and the B-side feed in an auctioneering fashion.

The "A" side feed of the load 102 may be connected to a first switch 501 of the switching assembly 504, and the "B" side feed of the load 102 may be connected to a second switch 503 of the switching assembly 504. In the case of a multi-corded load 102, additional feeds of the load 102 may be connected to additional switches of the switching assembly 504. Each switch 501, 503 of the switching assembly 504 may be connected to both a power module 106, such as a fuel cell (e.g., SOFC) module via a UPM 202, as described above, and to a grid source 114, which may be an AC or DC campus or utility grid, as also described above.

Thus, depending on the configuration of the switches 501, 503, both the A-side and B-side feeds of the load 102 may be supplied by the power module 106 via the UPM 202, a first side (e.g., the A- or B-side) may be supplied by the power module 106/UPM 202 and the other side may be supplied by the grid 114, or both the A-side and B-side feeds of the load 102 may be supplied by the grid 114. As shown in FIG. 5, for example, the first switch 501 is configured such that the "A" side of the load 102 is fed by the grid 114 and the second switch 503 is configured such that the "B" side of the load 102 is fed by the power module 106 via the UPM 202.

Each of the switches 501, 503 may be a fast-acting transfer switch that may be configured to switch between fuel cell module power and grid power in less than about 250 msec (e.g., 1-200 msec, such as about 20-100 msec). The switches 501, 503 may be solid-state based switches, and may be "static transfer switch" type switches. A static transfer switch (STS) may include solid state components, such as silicon-controlled rectifiers (SCRs) to provide rapid transfer of a load between two sources, such as within a fraction of a frequency cycle in an AC power system.

Each of the switches 501, 503 may be configured to select between the grid 114 and the fuel cell power module 106 output in a power seeking fashion. Thus, in the event of a failure of the power module 106 and/or UPM 202 output, switch 503 in FIG. 5 may quickly transfer to grid power, so that both the A-side and B-side feeds of the load 102 are powered by the grid 114. The UPM 202 may include or be coupled to a synchronization circuit 405, as described above, to maintain the UPM 202 output synchronized to the grid 114. In the event of a grid 114 failure, switch 501 in FIG. 5 may quickly transfer to UPM 202 power, so that both the A-side and B-side feeds of the load 102 are powered by the fuel cell power module 106 via the UPM 202. No single component failure (e.g., power module 106, UPM 202, grid 114 or switch 501, 503 failure) results in loss of power to the load 102 in the embodiment of FIG. 5.

Although the embodiment shown in FIG. 5 includes a "dual corded" load 102 having two power supply inputs, it will be understood that the various embodiments of a switching assembly 504 are not limited to such a configuration. For example, the load 102 may have more than two supply inputs, and each supply input may be coupled to a fast-acting transfer switch (e.g., STS) that may select between fuel cell module and grid power. In some embodiments, the load 102 may have a single supply input, and the switching assembly 505 may include a single fast-acting transfer switch coupled to the supply input that may select between fuel cell module and grid power.

Figure 6:
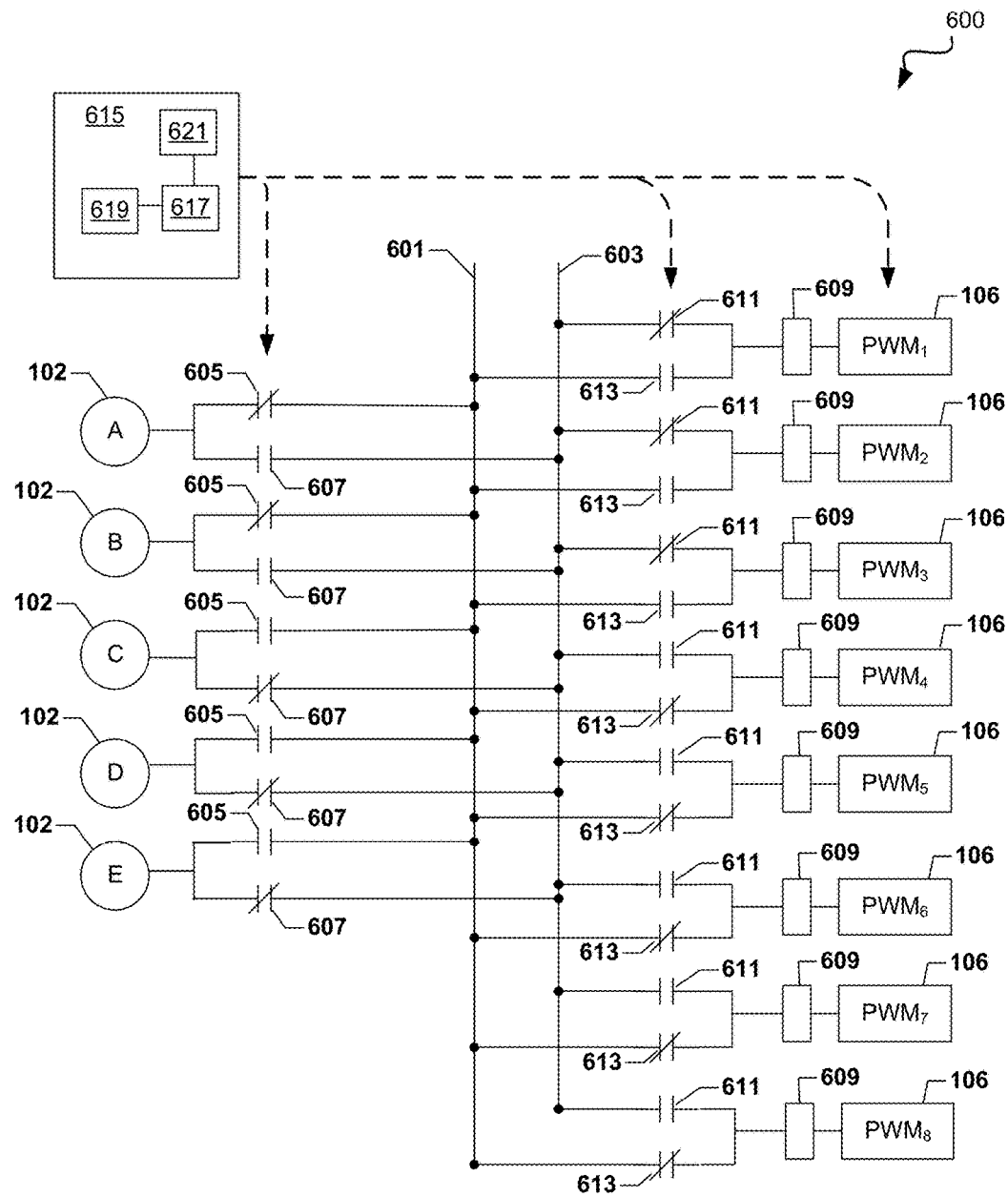
FIG. 6 illustrates a system for powering a plurality of loads using fuel cell power modules.

Further embodiments include methods and systems for linking fuel cell modules together in dense arrangement and providing power to a plurality of loads, such as data center IT loads, based on load priority and/or redundancy requirements. FIG. 6 schematically illustrates a system 600 for powering a plurality of loads 102 using fuel cell power modules 106, such as described above. The embodiment shown in FIG. 6 includes two power buses 601, 603, with a first plurality of loads 102 (i.e., loads "A" and "B") connected to a first bus 601, and a second plurality of loads 102 (i.e., loads "C," "D" and "E") connected to a second bus 603. It will be understood that although two buses 601, 603 are shown in FIG. 6 any number of buses may be utilized. Further, each bus may be segmented into smaller buses. Furthermore, any number of loads 102 may be connected to the buses 601, 603.

Each of the loads 102 (i.e., "A" through "E") is coupled to a set of switches, such as contactors 605, 607 that enable the load 102 to be selectively connected to and disconnected from each bus 601, 603. For example, in FIG. 6 loads "A" and "B" are connected to bus 601 by contactors 605, and loads "C," "D" and "E" are connected to bus 603 by contactors 607. Alternatively, DC-DC or DC-AC power electronics may be located between buses 601, 603 and loads 102 to allow deterministic current feed to loads.

The system 600 also includes a plurality of fuel cell (e.g., SOFC) power modules 106 (i.e., $PWM_1$ through $PWM_8$), which may be as described above. Each power module 106 is coupled to a power electronics module 609 (e.g., a DC/DC converter or DC/AC inverter unit) that provides a conditioned power output for use by one or more loads 102. Each of the power modules 106 is coupled via the electronics module 609 to a set of switches, such as contactors 611, 613 that enable the power module 106 to be selectively connected to and disconnected from each bus 601, 603. For example, in FIG. 6 power modules $PWM_1$, $PWM_2$ and $PWM_3$ are connected to bus 603, and $PWM_4$, $PWM_5$, $PWM_6$, $PWM_7$ and $PWM_8$ are connected to bus 601. Thus, in the illustrated example, loads "A" and "B" are powered by power modules $PWM_4$, $PWM_5$, $PWM_6$, $PWM_7$ and $PWM_8$ via bus 601, and loads "C," "D" and "E" are powered by power modules $PWM_1$, $PWM_2$ and $PWM_3$ via bus 603. Alternatively, fuel cell power modules 106 could have multiple outputs (e.g., one DC/DC converter per bus) to allow simultaneous powering of multiple buses. In embodiments, the fuel cell modules 106 may be coupled to energy storage devices, such as ultracapacitors, battery systems, etc. (not shown), and may provide excess power to the energy storage devices for later use by the system 600.

The system 600 may also include a control unit 615 for controlling the operation of the system 600. In embodiments, the control unit 615 may be configured to control the operation of the fuel cell power modules 106, and may also be configured to control the loads 102 and power modules 106 connected to each bus 601, 603 (e.g., by selectively opening and closing contactors 605, 607, 611 and 613). The control unit 615 may include a processor 617 coupled to a user interface component 621 to enable an operator to control the operation of the system 600. In embodiments, the processor 617 may be coupled to a memory 619 containing processor-executable instructions that, when executed by the processor, control the operation of the system 600 in accordance with one or more stored control schemes or algorithms. For example, a control scheme may modify the loads 102 and/or power modules 106 coupled to one or more bus 601, 603 in response to a load increase or decrease, a failure of a power module 106, an increase or decrease in a desired redundancy factor, or other parameters, as described below.

Figure 7A:
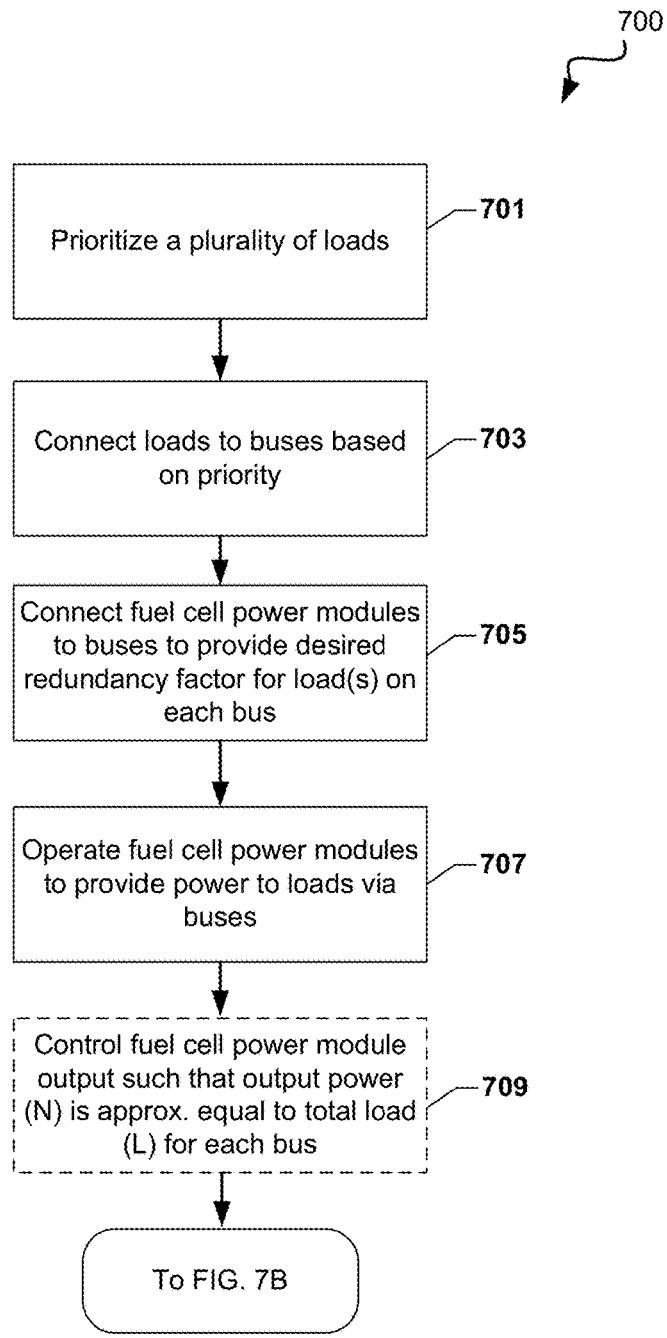
FIGS. 7A-B are process flow diagrams illustrating an embodiment method for providing power to a plurality of loads.
Figure 7B:
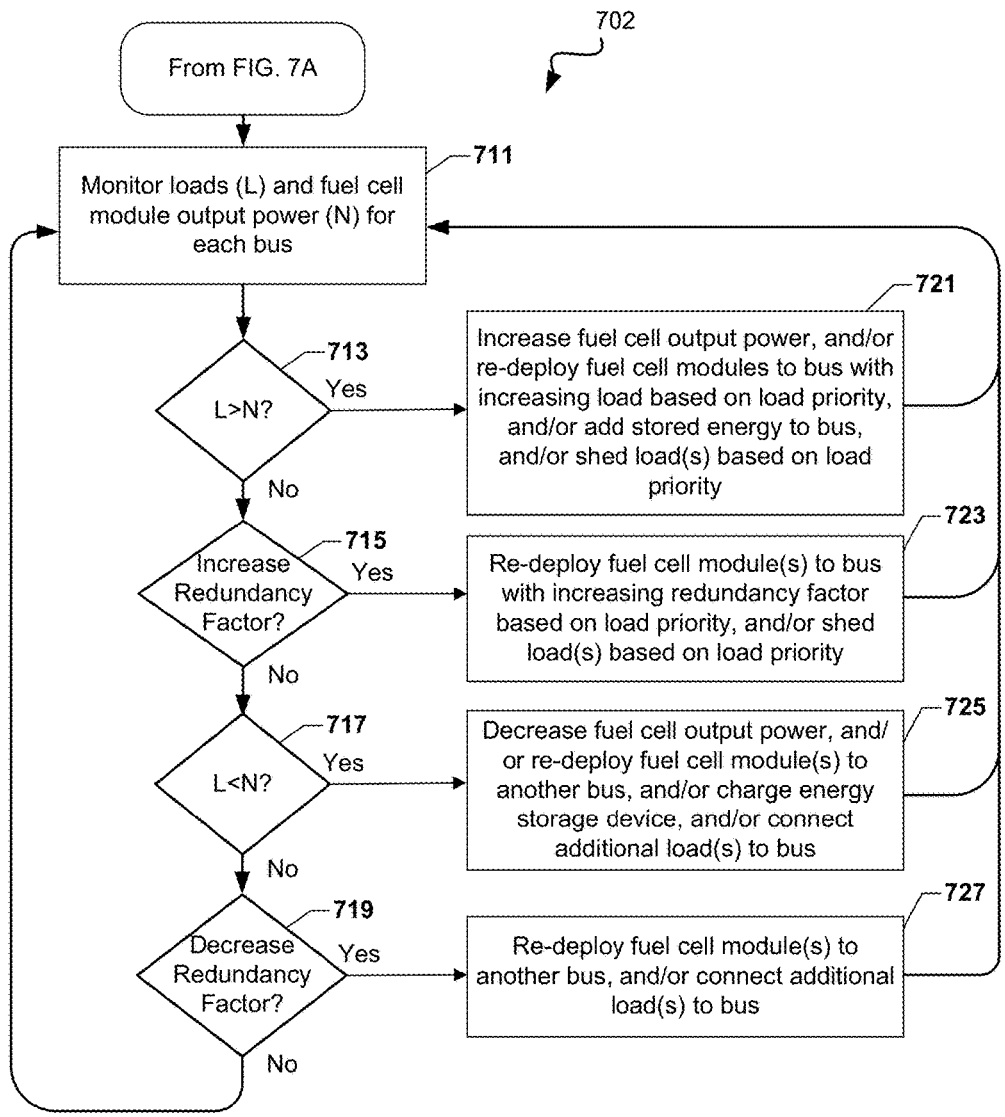

An embodiment method 700 of controlling a fuel cell power system is illustrated by the process flow diagram of FIGS. 7A-B. The method 700 may be implemented in a fuel cell power system having a plurality of loads and a plurality of fuel cell power modules, such as system 600 shown in FIG. 6. In block 701, the plurality of loads are prioritized (e.g., from highest to lowest priority, such as loads 102 "A" through "E" in FIG. 6). The prioritization may be based on one or more of load demand and the impact of a short-term loss of loads (e.g., higher priority mission critical loads vs. lower priority other loads).

In block 703, the loads are connected to a plurality of buses based on priority. For example, as shown in FIG. 6, loads "A" and "B," having the highest priority, are assigned to the "higher priority" bus 601, and loads "C," "D" and "E," having lower priority, are assigned to "lower priority" bus 603. Any number of loads may be connected to a bus, and a system may have any number of buses. Once the loads are assigned and connected to each bus, each bus has a total load, L, connected to it.

In block 705, one or more fuel cell power modules are connected to each bus to provide a desired redundancy factor for the load(s) on each bus. The "redundancy factor" is a measure of the excess capacity of a group of power generators, and may refer to the fraction of power generators of the group that may be lost and still meet the power requirements of a given load, L (i.e., the fraction of generators that are redundant). For example, assuming a 1 Megawatt load powered by five distributed generators (e.g., fuel cell power modules) each with a 250 kilowatt capacity, the redundancy factor is n+1, meaning that one generator may be lost and the load may still be maintained. If these same five generators are used to power a 750 kilowatt load, the redundancy factor would be n+2, since two generators may be lost while still maintaining the load.

In embodiments, the redundancy factor for each bus may be determined based on the priority of the loads attached to the bus. For example, buses serving higher priority loads may have relatively higher redundancy factors, and buses serving lower priority loads may have relatively lower redundancy factors, including zero redundancy, meaning that if a power module fails, the remaining modules will be unable to support the load.

In the embodiment system 600 of FIG. 6, for example, fuel cell power modules 106 $PWM_4$, $PWM_5$, $PWM_6$, $PWM_7$ and $PWM_8$ are connected to the higher priority loads 102 "A" and "B" by bus 601, and power modules 106 $PWM_1$, $PWM_2$ and $PWM_3$ are connected to lower priority loads "C," "D" and "E" by bus 603. Assuming that the output of each module 106 and the power requirements of each load 102 are equal, then the redundancy factor for bus 601 (five power modules for two loads) is higher than the redundancy factor for bus 603 (three power modules for three loads).

In block 707, the fuel cell power modules are operated to provide power to the loads via the buses. As shown in optional block 709, the fuel cell power modules may optionally be controlled such that the output power of one or more fuel cell modules is reduced until the total output power, N, of all fuel cell power modules connected to each bus is approximately equal to the total load, L, required by all loads connected to the bus.

The method 700 may then proceed to method 702 shown in FIG. 7B. In block 711 of method 702, the total load, L, and fuel cell module power module output power, N, may be monitored for each bus. If the load increases relative to the output power, e.g., such that the instantaneous load power requirement, L, of the bus exceeds the total output power, N, of the fuel cell power modules connected to the bus (i.e., determination block 713="Yes"), then the method proceeds to block 721.

An increase in bus load, L, relative to fuel cell module output power, N, may be caused by an increase in power requirements for the load(s), and/or a failure of one or more fuel cell modules, for example.

In block 721, in response to a detected increase in the load relative to the fuel cell module power output, one or more of the following actions may be taken: the output of one or more fuel cell modules connected to the bus may be increased to increase the total power output, N, to the bus, one or more additional fuel cell power modules may be re-deployed (i.e., connected) to the bus, stored energy may be added to the bus, and one or more loads may be shed (i.e., disconnected) from the bus. In embodiments, the fuel cell module output may be increased to meet load demand if there is excess capacity available from the modules already connected to the bus. Alternatively or in addition, stored energy, if available, may be used to meet an increase in load demand. If there is insufficient excess capacity or stored energy, then modules may be redeployed to the bus to satisfy the increased load demand. For example, one or more modules may be disconnected from another bus and connected to the bus experienced increased load. This may be performed based on the priority of the loads connected to the respective busses (i.e., fuel cell module(s) may be disconnected from a bus serving lower priority loads and connected to a bus serving higher priority loads). Alternatively or in addition, the response to an increased load demand may include disconnecting one or more loads from a bus. For example, one or more loads may be disconnected from the bus with the increased load demand, based on load priority. The disconnected load(s) may be shifted to a different bus, or may be powered down. In embodiments, one or more loads from a different bus may be disconnected to free fuel cell power module capacity which may be redeployed to the bus with increased load demand. This may be performed based on load prioritization. The loads (L) and output power (N) for each bus may continue to be monitored at block 711.

If there is an increase in the redundancy factor for a particular bus (i.e., determination block 715="Yes"), then the method proceeds to block 723. An increase in redundancy factor may result from a change in prioritization or criticality of one or more loads of the system, and/or from the availability of additional power generating capacity in the system, for example.

In block 723, in response to an increase in redundancy factor for a particular bus, one or more of the following actions may be taken: one or more additional fuel cell power modules may be re-deployed (i.e., connected) to the bus, and one or more loads may be shed (i.e., disconnected) from the bus. For example, one or more modules may be disconnected from another bus and connected to the particular bus to provide the increased redundancy factor. This may be performed based on the priority of the loads connected to the respective busses (i.e., fuel cell module(s) may be disconnected from a bus serving lower priority loads and connected to a bus serving higher priority loads). Alternatively or in addition, the response to an increased redundancy factor may include disconnecting one or more loads from a bus. For example, one or more loads may be disconnected from the bus with the increased redundancy factor, based on load priority. The disconnected load(s) may be shifted to a different bus, or may be powered down. In embodiments, one or more loads from a different bus may be disconnected to free fuel cell power module capacity which may be redeployed to the bus with an increased redundancy factor. This may be performed based on load prioritization. The loads (L) and output power (N) for each bus may continue to be monitored at block 711.

If the load decreases relative to the output power, e.g., such that the instantaneous load power requirement, L, of the bus is less than the total output power, N, of the fuel cell power modules connected to the bus (i.e., determination block 717="Yes") then the method proceeds to block 725. In block 725, in response to a detected decrease in the load relative to the fuel cell power module output for a particular bus, one or more of the following actions may be taken: the output of one or more fuel cell power modules may be decreased to decrease the total power output, N, to the bus, one or more fuel cell power modules may be disconnected from the bus and re-deployed to another bus, the excess energy from the fuel cell modules may be used to charge an energy storage device, and one or more additional loads may be connected to the bus. The redeployment of fuel cell power modules to another bus may be based on the priority of the load(s) attached to the respective buses. Similarly, additional load(s) may be connected to the bus based on the priority of the loads. The loads (L) and output power (N) for each bus may continue to be monitored at block 711.

If there is decrease in the redundancy factor for a particular bus (i.e., determination block 719="Yes"), then the method proceeds to block 727. In block 727, in response to a decrease in redundancy factor for a particular bus, one or more of the following actions may be taken: one or more fuel cell power modules may be disconnected from the bus and re-deployed to another bus, and one or more additional loads may be connected to the bus. The redeployment of fuel cell power modules to another bus may be based on the priority of the load(s) attached to the respective buses. Similarly, additional load(s) may be connected to the bus based on the priority of the loads. The loads (L) and output power (N) for each bus may continue to be monitored at block 711.

Figure 8:
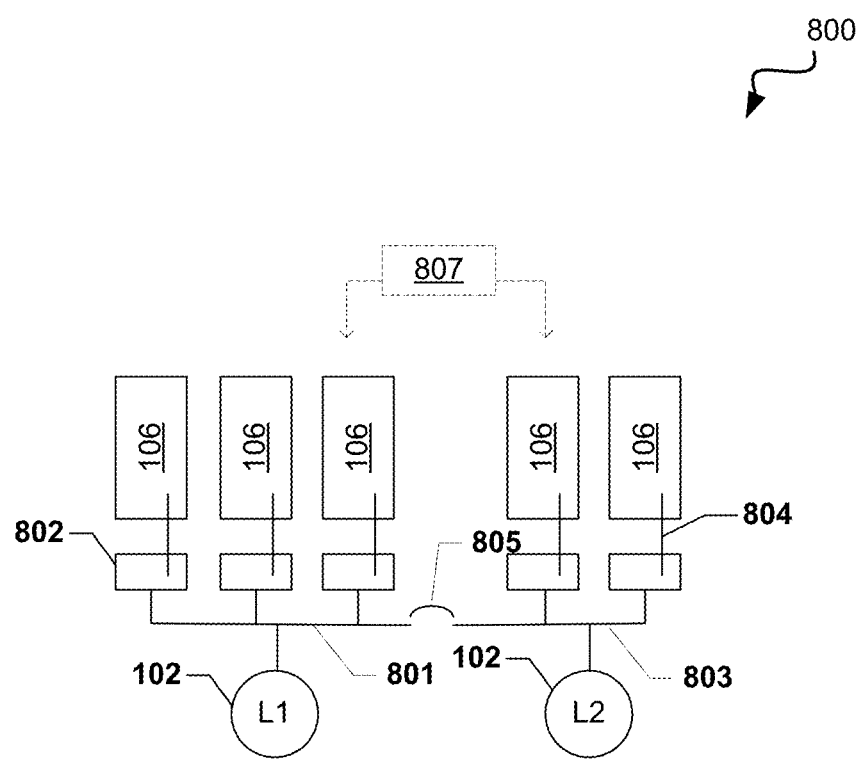
FIG. 8 illustrates a system for sharing loads between groups of fuel cell power modules using a tie breaker.
Figure 9:
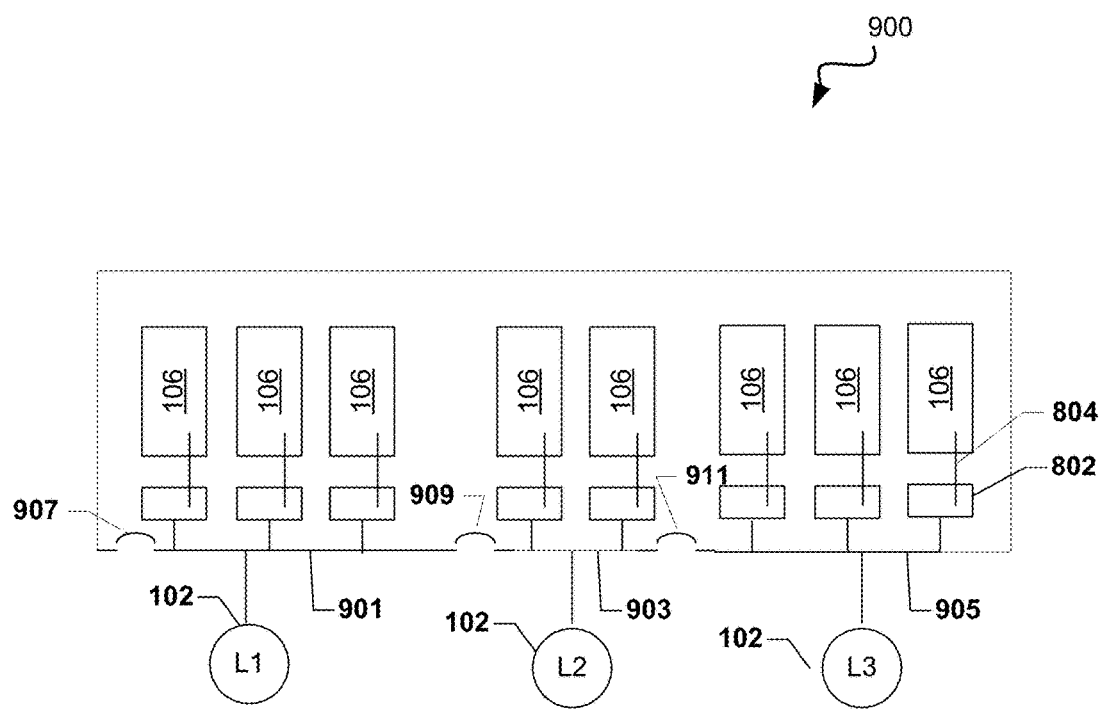
FIG. 9 illustrates a system for sharing loads between groups of fuel cell power modules using tie breakers in a ring bus configuration.
Figure 10:
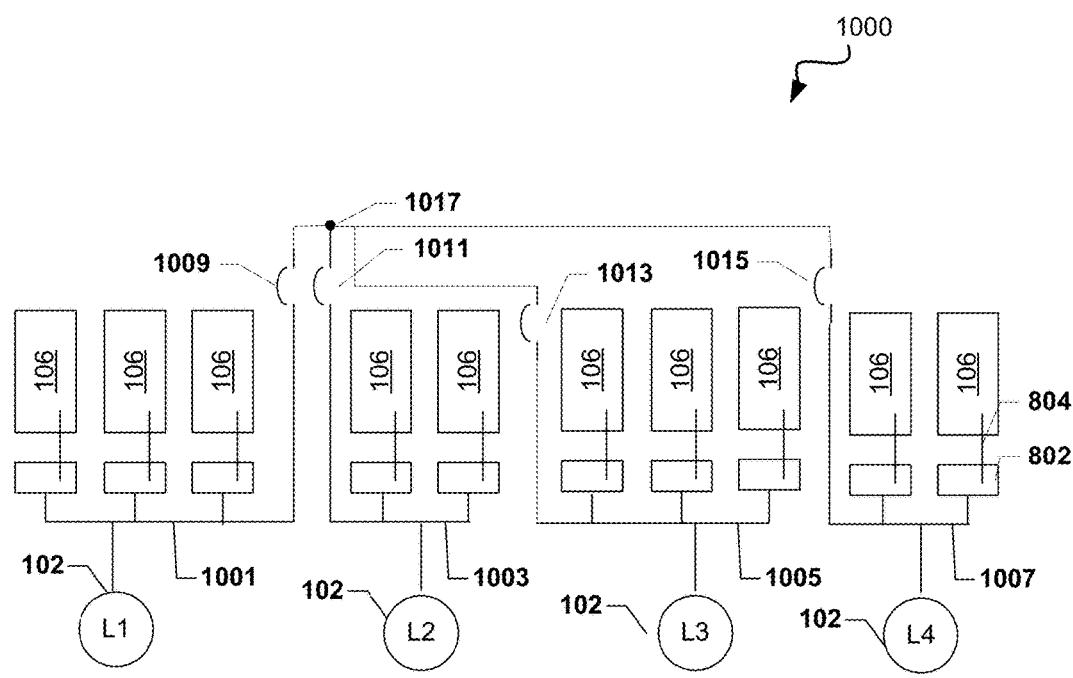
FIG. 10 illustrates a system for sharing loads between groups of fuel cell power modules using tie breakers in a star bus configuration.

FIGS. 8-10 illustrate example systems for sharing loads between groups of fuel cell power generators. The embodiments of FIGS. 8-10 may be used to implement the method of controlling a fuel cell power system as described above in connection with FIGS. 7A-B.

The system 800 of FIG. 8 includes a plurality of fuel cell power modules 106. A first group of power modules 106 is connected to a first bus 801, and a second group of power modules 106 is connected to a second bus 803. A first load 102 (L1), which may include one or more data center components, is connected to the first bus 801, and a second load 102 (L2), which may include one or more data center components, is connected to the second bus 802. Each power module 106 may be coupled to a power electronics module 802 (e.g., a DC/DC converter or DC/AC inverter unit) that provides a conditioned power output for use by one or more loads 102. Each power module 106 may include a plurality of fuel cell generators which may be linked via a bi-polar (e.g., ±380 VDC) split bus 804 that is connected to the power electronics module 802. In embodiments, the power modules 106 may have one or more additional outputs (not illustrated), such that one output feeds a critical load 102, and another is tied to a non-critical output, such as the utility or campus grid or an energy storage device.

The system 800 of FIG. 8 may therefore be similar to the system 600 of FIG. 6. In the embodiment of FIG. 8, the buses 801, 803 are coupled by a tie breaker 805. Thus, rather than connecting each load and power module individually to respective buses, as in FIG. 6, the tie breaker 805 may be closed to electrically connect buses 801 and 803. Loads L1 and L2 may then be shared by the two groups of power modules 106 connected to the respective buses 801, 803.

In embodiments, an optional phase synchronization controller 807 may maintain the output of the first group of power modules 106 coupled to bus 801 in phase with the second group of power modules 106 coupled to bus 803. Thus, when the tie breaker 805 is closed, the power output from both groups of power modules 106 may by synchronized. In some embodiments, paralleling control of the output is accomplished by matching phase and voltage and after tie breaker 805 closing, load is shifted by controlling inverter output or DC/DC converter output current commands, or by a scheme such as frequency droop load sharing control.

The closing and opening of the tie breaker 805 may be performed based on load prioritization and/or to provide a desired redundancy factor, as described above. For example, a tie breaker 805 may be opened or closed to increase the output capacity or redundancy factor for a higher priority load and decrease the capacity or redundancy factor for a lower priority load.

As shown in FIGS. 9 and 10, the above-described concept may be utilized in a ring or star bus network configuration. FIG. 9 illustrates a system 900 having three buses 901, 903, 905 coupled by tie breakers 907, 909, 911 in a ring bus configuration. The tie breakers 907, 909, 911 may be closed to share fuel cell modules 106 and loads 102 between any subset of adjacent buses within the ring.

FIG. 10 illustrates a system having four buses 1001, 1003, 1005, 1007 coupled by tie breakers 1009, 1011, 1013, 1015 to a common node 1017 in a star bus configuration. The tie breakers 1009, 1011, 1013, 1015 may be closed to connect any subset of buses 1001, 1003, 1005, 1007 across the node 1017.

It will be understood that the above-described systems 600, 800, 900 and 1000 and methods 700, 702 are not limited to data centers, and any critical power site with access to a distributed power source, such as a fuel cell power module, and a grid power source, may utilize the present systems and methods for powering a load.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of providing power to a plurality of loads, comprising:
   prioritizing the plurality of loads;
   connecting the loads to buses based on the load priority;
   connecting a group of fuel cell power modules to each of the buses to provide a desired redundancy factor for the loads on each bus, wherein the redundancy factor represents a non-zero integer number of fuel cell power modules of the group of fuel cell power modules that may be lost while still meeting a power requirement of the loads connected to each bus;
   operating the fuel cell power modules to provide power to the loads via the buses;
   monitoring a load requirement and the power output of the fuel cell power modules for each bus; and
   in response to determining that the redundancy factor of the loads of a particular bus is increased, redeploying fuel cell modules to the particular bus from another bus based on load priority.

2. The method of claim 1, further comprising:
   controlling a power output of the fuel cell power modules such that the total power output of the fuel cell power modules connected to each bus is approximately equal to the total load on each bus.

3. The method of claim 1, wherein in response to determining that the load requirement exceeds the power output of the fuel cell power modules on a particular bus, performing at least one of:
   increasing the fuel cell power module output power;
   redeploying fuel cell modules to the particular bus from another bus based on load priority;
   adding stored energy to the particular bus from an energy storage device; and
   shedding one or more loads from the particular bus based on load priority.

4. The method of claim 1, wherein in response to determining that the power output of the fuel cell power modules exceeds the load requirement on a particular bus, performing at least one of:
   decreasing the fuel cell power module output power;
   redeploying one or more fuel cell power modules from the particular bus to another bus based on load priority;
   charging an energy storage device; and
   connecting at least one additional load to the particular bus based on load priority.

5. The method of claim 1, wherein in response to determining that the redundancy factor of the loads on a particular bus is decreased, performing at least one of:
   redeploying one or more fuel cell power modules from the particular bus to another bus based on load priority; and
   connecting at least one additional load to the particular bus based on load priority.

6. A system for providing power to a plurality of loads, comprising:
   a plurality of fuel cell power modules;
   a plurality of power buses configured such that one or more loads may be connected to each bus and one or more fuel cell power modules may be connected to each bus to provide output power to the loads; and
   a controller, coupled to the plurality of fuel cell power modules and the plurality of power buses and having a processor configured with processor-executable instructions to perform operations comprising:
   prioritizing the plurality of loads;
   connecting the loads to the plurality of buses based on the load priority;
   connecting a group of fuel cell power modules to each of the plurality of buses to provide a desired redundancy factor for the loads on each bus, wherein the redundancy factor represents a non-zero integer number of fuel cell power modules of the group of fuel cell power modules that may be lost while still meeting a power requirement of the loads connected to each bus;

operating the fuel cell power modules to provide power to the loads via the buses;

monitoring a load requirement and power output of the fuel cell power modules for each bus; and in response to determining that the redundancy factor of the loads of a particular bus is increased, the controller redeploys fuel cell modules to the particular bus from another bus based on load priority.

7. The system of claim 6, wherein the controller processor is configured with processor-executable instructions to perform operations further comprising:

controlling a power output of the fuel cell power modules such that the total power output of the fuel cell power modules connected to each bus is approximately equal to the total load on each bus.

8. The system of claim 6, wherein the controller processor is configured with processor-executable instructions to perform operations such that in response to determining that the load requirement exceeds the power output of the fuel cell power modules on a particular bus, the controller performs at least one of:

increasing the fuel cell power module output power;

redeploying fuel cell modules to the particular bus from another bus based on load priority;

adding stored energy to the particular bus from an energy storage device; and shedding one or more loads from the particular bus based on load priority.

9. The system of claim 6, wherein the controller processor is configured with processor-executable instructions to perform operations such that in response to determining that the power output of the fuel cell power modules exceeds the load requirement on a particular bus, the controller performs at least one of:

decreasing the fuel cell power module output power;

redeploying one or more fuel cell power modules from the particular bus to another bus based on load priority;

charging an energy storage device; and connecting at least one additional load to the particular bus based on load priority.

10. The system of claim 6, wherein the controller processor is configured with processor-executable instructions to perform operations such that in response to determining that the redundancy factor of the loads on a particular bus is decreased, the controller performs at least one of:

redeploying one or more fuel cell power modules from the particular bus to another bus based on load priority; and connecting at least one additional load to the particular bus based on load priority.

11. The system of claim 6, further comprising a first plurality of contactors configured such that each load may be selectively connected to and disconnected from any one of a plurality of buses.

12. The system of claim 11, further comprising a second plurality of contactors configured such that each fuel cell power module may be selectively connected to and disconnected from any one of the plurality of buses.

13. The system of claim 6, further comprising:

at least one tie breaker configured to selectively connect at least two buses to share loads between a plurality of fuel cell power modules.

14. The system of claim 6, wherein the at least one tie breaker connects the at least two buses in a ring bus configuration.

15. The system of claim 14, wherein the at least one tie breaker connects the at least two buses in a star bus configuration.

* * * * *